US011886462B2

(12) United States Patent
Benoit

(10) Patent No.: US 11,886,462 B2
(45) Date of Patent: Jan. 30, 2024

(54) INTELLIGENT TRANSFORMATION OF MULTIDIMENSIONAL DATA FOR AUTOMATIC GENERATION OF PIVOT TABLES

(71) Applicant: Microsoft Technology Licensing, LLC, Redmond, WA (US)

(72) Inventor: Alexandre Benoit, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 18 days.

(21) Appl. No.: 17/546,794

(22) Filed: Dec. 9, 2021

(65) Prior Publication Data

US 2023/0185820 A1    Jun. 15, 2023

(51) Int. Cl.
*G06F 16/25* (2019.01)
*G06F 16/22* (2019.01)

(52) U.S. Cl.
CPC ........ *G06F 16/258* (2019.01); *G06F 16/2282* (2019.01)

(58) Field of Classification Search
CPC ............................ G06F 16/258; G06F 16/2282
See application file for complete search history.

(56) References Cited

U.S. PATENT DOCUMENTS

| | | | |
|---|---|---|---|
| 6,411,313 B1 | 6/2002 | Conlon et al. | |
| 7,480,675 B2 | 1/2009 | Folting et al. | |
| 11,269,887 B2 * | 3/2022 | Frantz | G06F 16/2365 |
| 2012/0159297 A1 * | 6/2012 | Peters | G06F 40/18 |
| | | | 715/212 |
| 2013/0262525 A1 * | 10/2013 | Burda | G06F 16/254 |
| | | | 707/802 |
| 2016/0364448 A1 * | 12/2016 | Wang | G06F 16/2453 |
| 2019/0332610 A1 * | 10/2019 | Krishna | G06F 16/2457 |
| 2020/0019540 A1 * | 1/2020 | Wolgé | G06F 16/22 |
| 2020/0301916 A1 * | 9/2020 | Nguyen | G06F 16/3344 |
| 2021/0319357 A1 * | 10/2021 | He | G06N 20/00 |

OTHER PUBLICATIONS

"Pivot table—Wikipedia", Retrieved from: https://en.wikipedia.org/w/index.php?title=Pivot_table&oldid=1056750732, Nov. 23, 2021, pp. 1-7.
"International Search Report and Written Opinion Issued in PCT Application No. PCT/US22/042403", dated Dec. 6, 2022, 12 Pages.

* cited by examiner

*Primary Examiner* — Dangelino N Gortayo

(57) ABSTRACT

In non-limiting examples of the present disclosure, systems, methods and devices for generating pivot tables are provided. A pivot table service may receive an indication to generate a pivot table. The pivot table service may transform a plurality of fields in an existing table in a software application from a first order to a semantic hierarchical order by applying a set of cardinality relationship rules to the plurality of fields. The pivot table service may identify a plurality of blocks comprising one or more fields from the semantic hierarchical order. Fields from each block may be populated and positioned in a pivot table that is being generated based on a cardinality value of each block.

20 Claims, 15 Drawing Sheets

INTELLIGENT TRANSFORMATION OF MULTIDIMENSIONAL DATA FOR AUTOMATIC GENERATION OF PIVOT TABLES

BACKGROUND

Tables in software applications and services typically include unstructured data that has semantic and hierarchical meaning to a user but not to the applications or services where the data resides. When generating pivot tables from such data users intuitively take the semantic and hierarchical relationships into account when selecting which fields to include in the pivot tables, and where to place those fields in relation to one another in the pivot tables. Software applications and services may automatically select fields from existing tables for use in generating pivot tables, but because those applications and services do not intrinsically understand the relationship of the fields to one another the resulting pivot tables are typically sparse and difficult to navigate.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Examples of the disclosure provide systems, methods, and devices for automatically generating pivot tables from unstructured data having multiple dimensions. According to a first example, a computer-implemented method is provided. The computer-implemented method comprises: receiving an indication to generate a pivot table from an existing table in a software application or service; determining a plurality of fields included in the existing table to populate the pivot table with; arranging, in memory, the plurality of fields in a first order; applying a set of cardinality relationship rules to the plurality of fields to transform the plurality of fields from the first order to a semantic hierarchical order; identifying a plurality of blocks included in the plurality of fields in the semantic hierarchical order; generating the pivot table with the plurality of fields, wherein the generating comprises: populating columns in the pivot table from fields included in one or more blocks of the plurality of blocks that have a cardinality value less than a threshold cardinality value, and populating rows in the pivot table from fields included in one or more blocks of the plurality of blocks that have a cardinality value that meets or exceeds the threshold cardinality value; and rendering the pivot table in the software application or service.

In another example, a system is provided. The system comprises a memory for storing executable program code; and a processor, functionally coupled to the memory, the processor being responsive to computer-executable instructions contained in the program code and operative to: receive an indication to generate a pivot table from an existing table in a software application or service; determine a plurality of fields included in the existing table to populate the pivot table with; arrange, in memory, the plurality of fields in a first order; apply a set of cardinality relationship rules to the plurality of fields to transform the plurality of fields from the first order to a semantic hierarchical order; identify a plurality of blocks included in the plurality of fields in the semantic hierarchical order; generate the pivot table with the plurality of fields, wherein the generating comprises: populating columns in the pivot table from fields included in a block of the plurality of blocks that has a cardinality value less than a threshold cardinality value, and populating rows in the pivot table from fields included in one or more blocks of the plurality of blocks that have a cardinality value that meets or exceeds the threshold cardinality value; and render the pivot table in the software application or service.

In another example, a computer-readable storage device is provided. The computer-readable storage device comprises executable instructions that, when executed by a processor, assist with generating a pivot table, the computer-readable storage device including instructions executable by the processor for: receiving an indication to generate the pivot table from an existing table in a software application or service; determining a plurality of fields included in the existing table to populate the pivot table with; arranging, in memory, the plurality of fields in a first order; applying a set of cardinality relationship rules to the plurality of fields to transform the plurality of fields from the first order to a semantic hierarchical order; identifying a plurality of blocks included in the plurality of fields in the semantic hierarchical order; generating the pivot table with the plurality of fields, wherein the generating comprises: populating columns in the pivot table from fields included in a block of the plurality of blocks that has a cardinality value less than a threshold cardinality value, and populating rows in the pivot table from fields included in one or more blocks of the plurality of blocks that have a cardinality value that meets or exceeds the threshold cardinality value; and rendering the pivot table in the software application or service.

BRIEF DESCRIPTION OF THE DRAWINGS

Non-limiting and non-exhaustive examples are described with reference to the following figures.

DETAILED DESCRIPTION

Figure 1:
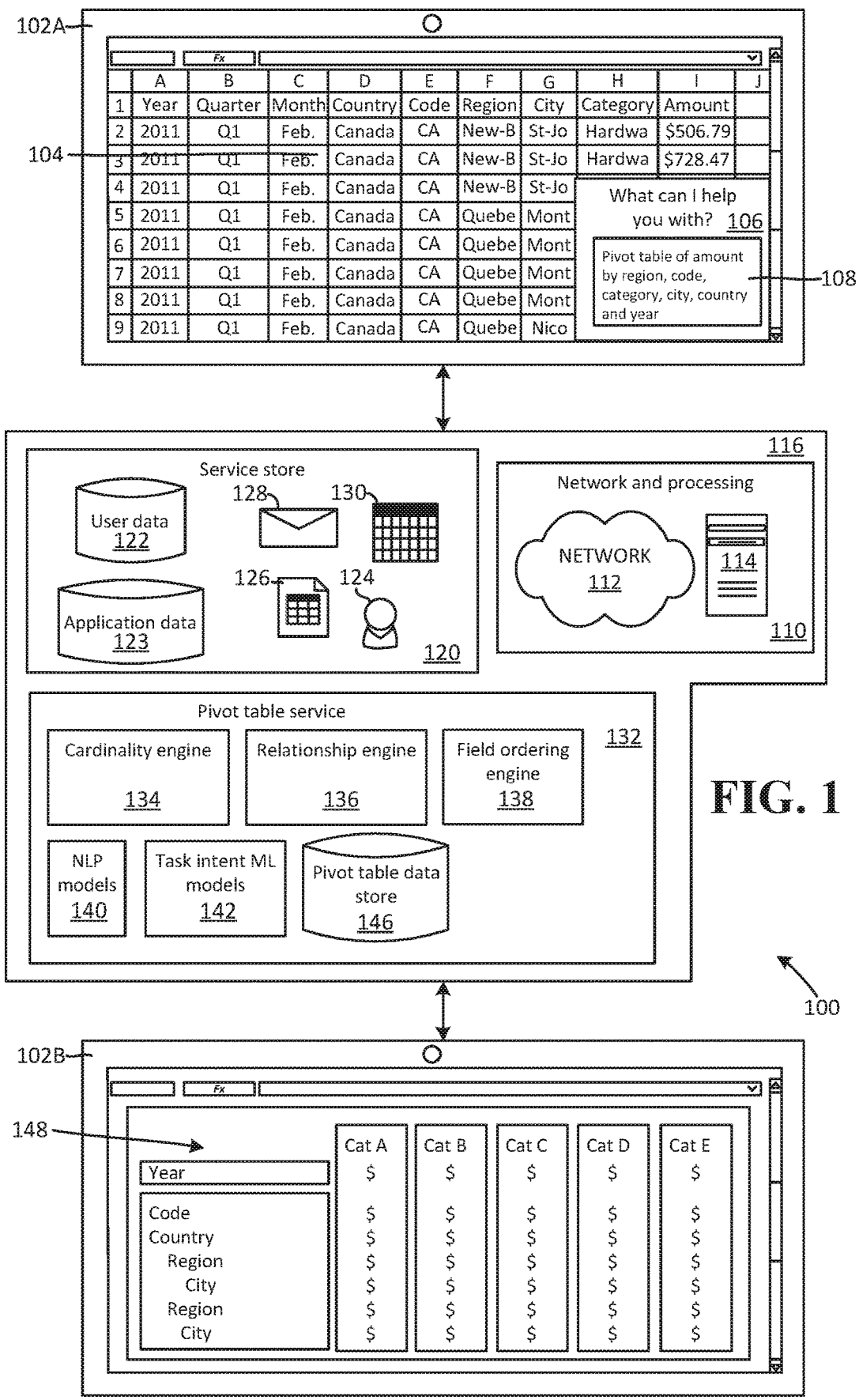
FIG. 1 is a schematic diagram illustrating an example distributed computing environment for automatically generating pivot tables.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Examples of the disclosure provide systems, methods, and devices for automatically generating pivot tables from unstructured data having multiple dimensions. As described herein unstructured data describes data in a dataset (e.g., in a table) which may have hierarchical and/or semantic relationships to a user, but which does not have those relationships associated with it in code. As described herein a dimension comprises a type of field included in a dataset. For example, a dataset tracking expenses may have dimensions of country, country code, region, city, year, category and amount. According to examples, a pivot table service may receive an indication to generate a pivot table from an existing table in a software application or service. In examples, the software application or service may comprise a spreadsheet application or service. In other examples, the software application or service may comprise a software application or service other than a spreadsheet application or service, such as a word processing application or service, a presentation application or service, a notes taking application or service, a task application or service, a meeting application or service, a messaging application or service, or an email application or service. In some examples, the existing table may comprise an object that is generated by a spreadsheet application or service and embedded in a different application or service.

The indication to generate a pivot table from an existing table in a software application or service may be received via various mechanisms. In some examples, the indication may comprise receiving and processing a natural language user input. In other examples, the indication may comprise receiving a manual input in a pivot table tool associated with a software application or service where the existing table resides. In additional examples, the indication may comprise an interaction with the existing table and/or one or more menus. In additional examples, the software application or service where the existing table resides may automatically suggest that a pivot table be generated based on one or more triggering events (e.g., temporal triggering event, cursor interaction triggering event).

The pivot table service may determine a plurality of fields from an existing table to include in a pivot table that is going to be generated. The determining may vary based on the mechanism by which the indication to generate the pivot table is received. For example, if a user manually selected (e.g., via drag and drop, via natural language input) fields for inclusion in the pivot table, the pivot table service may simply utilize those fields for generating the pivot table. Alternatively, in examples where the pivot table service automatically suggests a pivot table be generated, the pivot table service may utilize one or more rules to select the fields that are to be included in the pivot table and/or apply one or more machine learning models for identifying fields that are likely to be useful to a user for inclusion in the pivot table.

The pivot table service may receive the plurality of fields for generating a pivot table with in a first order and transform those fields from the first order to a semantic hierarchical order by applying a set of cardinality relationship rules to the plurality of fields. As described herein, "cardinality" refers to a number of elements in a given mathematical set. The elements described herein primarily correspond to fields included in tables of software applications or services. To apply the cardinality relationship rules the pivot table service may first determine a cardinality value for each of the fields that are to be included in the pivot table as well as a cardinality value for each set of fields that are to be included in the pivot table. Cardinality relationships between each set of fields may then be determined. Once the cardinality relationships are determined the cardinality relationship rules may be applied to the plurality of fields so that the fields can be transformed from the first order to the semantic hierarchical order. In some examples, the semantic hierarchical order may comprise fields having many-to-one cardinality relationships arranged before any other fields, fields having one-to-one cardinality relationships arranged directly after fields having many-to-one cardinality relationships, fields having one-to-many cardinality relationships arranged directly after fields having one-to-one cardinality relationships, and fields having many-to-many cardinality relationships arranged directly after fields having one-to-many cardinality relationships.

Once the fields are transformed to the semantic hierarchical order the pivot table service may identify a plurality of blocks included in the plurality of fields in the semantic hierarchical order. In identifying the plurality of blocks the pivot table service may identify one or more consecutive fields in the semantic hierarchical order that comprise many-to-many relationships and/or consecutive fields in the semantic hierarchical order that comprise many-to-one cardinality relationships. The boundary of each block comprises the intersection of a many-to-many relationship or a many-to-one cardinality relationship in consecutive fields in the semantic hierarchical order.

The pivot table service may populate a pivot table utilizing the blocks. In populating a pivot table, the pivot table service may order the blocks according to their cardinality values. The pivot table service may populate the pivot table with fields in each block, while processing each block in ascending order based on cardinality value of each block. That is, the first block of one or more fields that is populated in a pivot table has the lowest cardinality value and the last block of one or more fields that is populated in a pivot table has the highest cardinality value. The pivot table service may utilize a threshold cardinality value in determining which blocks and corresponding fields to populate columns with and which blocks and corresponding fields to populate rows with. The threshold cardinality value may be dynamic in nature and automatically be modified based on analysis of one or more factors. Utilization of the threshold cardinality value limits how wide a pivot table becomes. This is useful because users typically do not prefer to scroll from left to right when viewing table data. As examples, the one or more factors that may affect the value of the threshold cardinality value may include a size of a display that the software application or service is displayed on, a size of an application window that the software application or service is rendered in, a font size of one or more characters included in an existing table a pivot table is being generated from, and/or a font size of one or more characters included in a pivot table that is being generated. The pivot table service populates fields from blocks with a cardinality value that is less than the threshold value in columns of a pivot table from left to right. Additionally, the combined cardinality value for fields that are populated in the columns of a pivot table is kept below the threshold cardinality value. This ensures that the width of the table is kept to an easily navigable size. In most examples once a first block is identified for populating columns with, only fields from that block will be populated in the columns. In such examples, the cardinality value of each remaining block need not be compared to the threshold cardinality value because the fields in each remaining block will be populated as rows in the pivot table. The pivot table service populates fields from blocks with a cardinality value that meets or exceeds the threshold cardinality value in rows of a pivot table from top to bottom. Once a pivot table has been populated it may be rendered in the software application or service. A pivot table may be displayed and/or audibly produced by the software application or service. In examples where only one block is identified, the pivot table service may only populate rows in the pivot table with the fields from that block.

The systems, methods, and devices described herein provide technical advantages for generating pivot tables from unstructured data. Fields in existing tables in software applications may be intelligently identified via novel machine learning models that have been trained to identify fields that are likely to be of value to a user in a pivot table. Those machine learning models may be trained (e.g., via back propagation to neural networks) and thereby even further improved by identifying positive or negative user sentiment in relation to one or more elements that are included in a pivot table that is generated by the pivot table service. The mechanisms described herein also provide novel mechanisms for transforming unstructured data that would otherwise result in nonsensical and sparse pivot tables into semantically and hierarchically organized data that can be automatically processed by the pivot table service for generating meaningful pivot tables that are easily traversable by users. Processing and memory resources for generating densely populated pivot tables are reduced via the mechanisms described herein. Prior to the current disclosure, to generate densely populated pivot tables a system would typically have to randomly select fields from an existing table and generate many different pivot tables to identify one, if any, densely populated pivot table. The generation of those many different tables required more processing resources than are necessary to achieve a densely populated pivot table according to the current description. The saving/caching of those tables for analysis required more memory resources than are required by the current description. Alternatively, by processing data sets utilizing cardinality relationships as described herein the pivot table service only needs to generate a single pivot table to arrive at a data structure that is densely populated. Pivot tables that are generated utilizing the description herein are not only densely populated but also include data that is arranged in hierarchically and semantically meaningful ways that. These data structures are easily navigable by users because of the cardinality thresholds that are utilized to populate the columns and rows of the pivot tables, whereas prior solutions would at best only arrive at semantically or hierarchically meaningful layouts by chance, if at all.

FIG. 1 is a schematic diagram illustrating an example distributed computing environment 100 for automatically generating pivot tables. Distributed computing environment includes client computing device 102 (e.g., client computing device 102A and client computing device 102B, which are the same computing device), and cloud computing sub-environment 116. Cloud computing sub-environment 116 includes service store 120, network and processing sub-environment 110, and pivot table service 132. Although some of the operations, engines, models, and stores are primarily described in relation to either local computing devices (e.g., client computing device 102) or the cloud (e.g., cloud computing sub-environment 116), any of those operations, engines, models, and/or stores may be executed and/or maintained entirely locally, entirely remotely (e.g., cloud based), and/or partially locally and partially remotely.

Network and processing sub-environment 110 includes network 112 and server computing device 114. Network 112 may comprise a wired or wireless network. Any and all of the computing devices described herein may communicate with one another via a network, such as network 112. Server computing device 114 is illustrative of one or more server computing devices that may host the services and stores described herein. For example, server computing device 114 may host service store 120 and/or pivot table service 132.

Service store 120 may include information associated with pivot table service 132 and/or one or more other applications or services. For example, service store 120 may include data associated with a plurality of applications or services. Application or service data may be stored in application data store 123. The aggregate information for a plurality of users associated with a productivity application suite, service, and/or one or more other applications or services may be included in application data store 123. User data (e.g., account identifiers, user preferences, passwords) may be stored in user data store 122. In some examples, user data store 122 and application data store 123 may be comprised in a same data store.

User data store 122 may be associated with a plurality of user accounts, such as user account 124. User account 124 may have granted pivot table service 132 with access to the user's application data. User account 124 may additionally or alternatively be associated with one or more productivity application services. In this example, user account 124 is associated with a spreadsheet application or service, an email application or service, and a calendar application or service. As such, service store 120 includes electronic messages 128 associated with user account 124, spreadsheet and/or table documents 126 associated with user account 124, and electronic calendar information 130 associated with user account 124. User data store 122 may include additional information from one or more other applications or services, such as SMS applications or services, group messaging/collaboration applications or services, social media applications or services, web browser applications or services, task management applications or services, word processing applications or services, to-do list applications or services, map applications or services, reservation applications or services, presentation applications or services, and/ or data visualization applications or services, for example. In some examples, user data store 122 may include information for user accounts associated with pivot table service 132.

Pivot table service 132 includes cardinality engine 134, relationship engine 136, field ordering engine 138, natural language processing models 140, task intent machine learning models 142 and pivot table data store 146. Pivot table service 132 may perform operations associated with intelligently generating pivot tables from existing table data. The pivot table service 132 may apply one or more machine learning models in determining whether to generate a pivot table from existing data. In some examples, the pivot table service 132 may automatically identify (e.g., via application of one or more machine learning models) one or more fields in an existing table that are to be included in a pivot table the pivot table service 132 is generating. In other examples, users may manually select one or more fields in an existing table that are to be included in a pivot table the pivot table service 132 is generating. Once the pivot table service 132 has determined a plurality of fields from an existing table to include in a pivot table, the pivot table service 132 may perform automated actions for transforming table data, determining cardinality relationships amongst fields, and ordering fields based on those cardinality relationships to intelligently and autonomously arrange fields in a pivot table that is being generated. The fields may be arranged and ordered in the pivot table to respect a semantic hierarchical order of the data in the originating table, provide densely populated pivot tables, and provide for an improved user interface for the pivot table such that it is easily navigable by users. According to some examples, pivot table service 132 may execute operations including: receiving an indication to generate a pivot table from an existing table in a software application or service; determining a plurality of fields included in the existing table to populate the pivot table with; arranging, in memory, the plurality of fields in a first order; applying a set of cardinality relationship rules to the plurality of fields to transform the plurality of fields from the first order to a semantic hierarchical order; identifying a plurality of blocks included in the plurality of fields in the semantic hierarchical order; generating the pivot table with the plurality of fields; and rendering the pivot table in the software application or service. In examples, generating the pivot table with the plurality of fields may comprise populating columns in the pivot table from fields included in one or more blocks of the plurality of blocks that have a cardinality value less than a threshold cardinality value, and populating rows in the pivot table from fields included in one or more blocks of the plurality of blocks that have a cardinality value that meets or exceeds the threshold cardinality value.

Cardinality engine 134 may perform operations associated with determining cardinality values corresponding to a number of instances of unique values for each of a plurality of fields included in a table of a software application or service (e.g., a table in spreadsheet application or service). Cardinality engine 134 may also perform operations associated with determining cardinality values corresponding to a number of unique values for combinations of a plurality of fields included in a table of a software application or service (e.g., a table in a spreadsheet application or service). In determining the cardinality values, the cardinality engine may transform the data from the existing table to a structured query language (SQL) format. The transformed table data may be stored in a data store, such as pivot table data store 146. The transformed data in the SQL format may be queried by the pivot table service 132 to determine cardinality values for each field and for combinations of fields. Additional details related to cardinality engine 134 are provided below in relation to FIG. 2.

Relationship engine 136 may perform operations associated with determining cardinality relationships between fields in an existing table in a software application or service. The relationship engine 136 determines cardinality relationships between pairs of fields in an existing table. In some examples, relationship engine 136 may only determine cardinality relationships for fields that the pivot table service 132 has determined are to be included in a pivot table, thereby reducing processing resources that would otherwise be required to determine relationships between each pair of fields in an existing table, despite each field from the existing table not being included in a pivot table that is being generated. The cardinality relationships that a first field may have to a second field include: one-to-one (sometimes referred to herein as 1-1 or 1-to-1), one-to-many (sometimes referred to herein as 1-N or 1-to-N), many-to-one (sometimes referred to herein as N-1 or N-to-1), and many-to-many (sometimes referred to herein as N-N or N-to-N). In some examples, in determining a cardinality value between a first field (e.g., field A) and a second field (field B), the relationship engine 136 may apply a set of rules. As described below, the cardinality of field A is represented by "cardA" and the cardinality of field B is represented by "cardB". Additionally, the cardinality of both combined fields is represented by "cardAB". An exemplary set of rules that relationship engine 136 may apply to determine cardinality relationships between a first field and a second field are as follows:

If cardAB=cardA=cardB, then the relationship between field A and field B is 1-to-1.

If cardAB=max(cardA, cardB), then the relationship between field A and field B is 1-to-N if max(cardA, cardB)=cardB and N-to-1 otherwise.

If cardAB>max(cardA, cardB), then the relationship between field A and field B is N-to-N.

In some examples, rather than applying a strict 1-to-N rule as defined above, the relationship engine may apply a cardinality relationship rule that takes into account scenarios where a data set (e.g., from an existing table) may include multiple values that would semantically make sense as a 1-to-N relationship, but based on the strict rule criteria above would be classified as an N-to-N relationship. One example of such a scenario would be a common city name (e.g., Springfield) being included in a city field, and the cardinality relationship between city and region fields being determined. For example, a first Springfield city may be located in an "Oregon" region, and a second Springfield city may be located in a "Massachusetts" region. Thus, based on a strict application of the rules described above, the city to region fields would have a relationship of N-to-N, whereas it would make semantic sense for those fields to have a 1-to-N relationship. The pivot table service 132 may treat weak N-to-N relationships as 1-to-N relationships to provide for generation of pivot tables that are semantically and hierarchically pleasing. For example, the relationship engine 136 may determine whether a cardinality relationship between a first field and a second field is 1-to-N or N-to-N by determining a cardinality ratio and comparing it to a threshold, where the threshold corresponds to an incidence of a value of the first field in the dataset (e.g., existing table). This determination may be made via application of the following function.

$$\text{Ratio} = (\text{card}AB - \text{max}AB)/(\text{card}A * \text{card}B - \text{max}AB).$$ In this function maxAB is defined as max(cardA, cardB).

The pivot table service 132 may set a threshold between the lower and upper bound that would provide the pivot point from a 1-to-N relationship to a N-to-N relationship. In the function above, the ratio is between 0 and 1. If the threshold is set to zero, then the relationship engine 136 would only allow strict 1-to-N relationships. However, if the threshold is set closer to 1, then N-to-N relationships would need to be very dense (e.g., have all combinations of unique values for each field). In practice, the pivot table service 132 may set a relatively small threshold (e.g., 3%, 5%, 7%, 10%), although the threshold may be modified based on various factors (e.g., number of rows or columns included in existing table, number of rows or columns included in pivot table that is being generated, type of data included in existing table, type of data that is to be included in pivot table being generated).

Field ordering engine 138 executes operations associated with the application of a set of cardinality relationship rules to a plurality of fields that are to be included in a pivot table to transform the plurality of fields from a first order to a semantic hierarchical order. Field ordering engine 138 analyzes the relationships determined by relationship engine 136 to transform the order of the fields that are going to be included in a pivot table to an order that can be utilized by the pivot table service 132 to generate pivot tables that make semantic and hierarchical sense, while also being easily navigable by users. The order in which the fields are received by field ordering engine 138 may be based on a manual selection order by a user (e.g., an order corresponding to which fields were dragged and dropped into a pivot table generation user interface/tool, an order corresponding to field position in a language input from the user to generate a pivot table), or based on one or more rules (e.g., order fields from left to right based on column position, order fields in alphabetical order). The pivot table service 132 may arrange and/or save the fields that are going to be utilized to populate a pivot table in memory in this first order.

Field ordering engine 138 receives the fields in the first order and applies a set of cardinality relationship rules to the fields to transform them from the first order to a semantic hierarchical order. In performing this transformation, field ordering engine 138 may arrange the fields such that: fields having many-to-one cardinality relationships are arranged before any other fields, fields having one-to-one cardinality relationships are arranged directly after fields having many-to-one cardinality relationships; fields having one-to-many cardinality relationships are arranged directly after fields having one-to-one cardinality relationships; and fields having many-to-many cardinality relationships are arranged directly after fields having one-to-many cardinality relationships. Additional details related to the ordering of the fields by field ordering engine 138 are provided in relation to FIGS. 6-7.

Once the fields are transformed from the first order to a semantic hierarchical order, field ordering engine 138 may identify a plurality of blocks included in the plurality of fields in the semantic hierarchical order. To identify the plurality of blocks, field ordering engine 138 may identify one or more consecutive fields in the semantic hierarchical order that comprise one-to-one cardinality relationships or one-to-many cardinality relationships. To identify the plurality of blocks, field ordering engine 138 may additionally or alternatively identify one or more consecutive fields in the semantic hierarchical order having many-to-many cardinality relationships. Moving from the beginning of the semantic hierarchical order to the end of the semantic hierarchical order (e.g., from left to right, from top to bottom), a block will only include fields with one-to-one cardinality relationships and/or fields with one-to-many cardinality relationships. Fields in the semantic hierarchical order with many-to-many relationships (again moving from the beginning of the semantic hierarchical order to the end of the semantic hierarchical order) are broken into their own blocks at their intersection by field ordering engine 138. Fields in the semantic hierarchical order (again moving from the beginning of the semantic hierarchical order to the end of the semantic hierarchical order) with many-to-one cardinality relationships are also broken into their own blocks at their intersection by field ordering engine 138. It should be understood that fields need not necessarily be arranged in the semantic hierarchical order from left to right. The fields may be arranged from right to left, top to bottom, bottom to top, or not even in direct alignment with one another (e.g., a first field may be saved in a first memory location and a second field in the order may be saved to a second memory location, the semantic hierarchical order may be maintained via compressed list). The beginning of the semantic hierarchical order starts with fields having many-to-one cardinality relationships, continues with fields having one-to-one cardinality relationships arranged directly after fields having many-to-one cardinality relationships, continues to fields having one-to-many cardinality relationships arranged directly after fields having one-to one cardinality relationships; and ends with fields having many-to-many cardinality relationships arranged directly after fields having one-to-many relationships.

Once the blocks have been identified, field ordering engine 138 may determine a cardinality of each block (e.g., the cardinality of all fields included in each block). In some examples, field ordering engine 138 may arrange the blocks in a block order based on the cardinality value of each block. The pivot table service 132 may then populate rows and columns of the pivot table that is being generated based on the block order (e.g., based on the cardinality of each block). In examples, the pivot table service 132 may populate columns in a pivot table from left to right and rows in a pivot table from top to bottom based on the cardinality value of each block. The pivot table service 132 may utilize a threshold cardinality value to determine whether to populate rows or columns of a pivot table with fields from a block. For example, if a cardinality value for a block is below a threshold cardinality value (e.g., 7, 10, 15), the field ordering engine may populate the fields in that block in the columns of a pivot table. Alternatively, if a cardinality value for a block meets or exceeds a threshold cardinality value (e.g., 7, 10, 15), the field ordering engine may populate the fields in that block in the rows of a pivot table. Utilization of the threshold cardinality value limits how wide a pivot table becomes. This may be the case because users typically do not prefer to scroll from left to right when viewing table data. They would prefer to look through large sets of data moving from top to bottom. In some examples, the threshold cardinality value may be dynamic in nature and change based on one or more of: a size of a display that the software application or service id displayed on, a size of an application window that the software application or service is rendered in, and a font size of one or more characters included in the existing table. Thus, in determining the threshold cardinality value, the pivot table service 132 may take into consideration the amount of available display size on a device and how much area is taken up by one or more objects on a display or user interface.

The combined cardinality value for fields that are populated in the columns of a pivot table is kept below the threshold cardinality value. This ensures that the width of the pivot table is kept to an easily navigable size. In most examples, once a first block is identified for populating columns with, only fields from that block will be populated in the columns. In such examples, the cardinality value of each remaining block need not be compared to the threshold cardinality value because the fields in each remaining block will be populated as rows in the pivot table. In examples where only one block is identified by the pivot table service 132, the pivot table service 132 may only populate rows in the pivot table with the fields from that block regardless of the cardinality value of that block.

In determining which order to populate a pivot table in, the pivot table service moves in ascending order from blocks with a lowest cardinality value to blocks with a highest cardinality value. The field(s) included in a block are populated into columns or rows (e.g., based on application of the threshold cardinality value) in their semantic hierarchical order. Additional details related to block ordering and pivot table population with fields included in blocks is provided below in relation to FIGS. 8-10.

There are a variety of mechanisms by which the pivot table service 132 may determine that it should generate a pivot table from an existing table in a software application or service. For example, a user may utilize one or more entry points to the software application or service (or a digital assistant associated with the software application or service) to indicate that a pivot table should be generated. In some examples, a user may provide the software application or service with a natural language input that indicates that a pivot table should be generated. In examples, pivot table service 132 (or a related application or service) may process the natural language inputs with task intent machine learning models 142. Task intent machine learning models 142 are illustrative of one or more machine learning models that have been trained to identify task intents (e.g., insert object, generate pivot table, open email draft). In some examples, task intent machine learning models 142 may comprise one or more neural networks that have been trained to classify natural language inputs into one or more task intent types. In some examples, the one or more neural networks may comprise a gated recurrent unit (GRU) neural network or bidirectional GRU (bi-GRU) neural network. In other examples, the one or more neural networks may comprise a long short-term memory (LSTM) neural network. In additional examples, task intent machine learning models 142 may comprise one or more vector embedding models that have been trained to classify natural language inputs into one or more task intent types. In additional examples, task intent machine learning models 142 may comprise one or more transformer-based models (e.g., Bidirectional Encoder Representations from Transformers [BERT], Embeddings from Language Model [ELMo], BigBird).

In additional examples, an indication to generate a pivot table from an existing dataset (e.g., existing table in a software application) may be received via a selection of a portion of the dataset (e.g., via a cursor, via a voice input) and interaction with a menu (or another voice input) to generate a pivot table that includes the selected portion of the dataset. In additional examples, an indication to generate a pivot table from an existing data set may be received via a pivot table tool and/or associated user interface. In some examples, the pivot table tool may include a user interface for dragging and dropping or otherwise moving identifiers for one or more fields into a pivot table generation user interface element. The pivot table service 132 may process those fields and/or their corresponding values as described above and intelligently generate visually pleasing (e.g., densely populated, semantically and hierarchically ordered) and easily navigable pivot tables.

In some examples, the pivot table service 132 may apply natural language processing models 140 to determine a plurality of fields included in an existing table to populate a pivot table with. For example, the pivot table service may receive an indication to generate a pivot table from an existing data set (e.g., existing table in a software application or service), and no particular fields may be manually indicated by the user for inclusion in the pivot table. The pivot table service 132 may automatically determine via natural language processing models 140 which subset of the fields to include in the pivot table. Natural language processing models 140 may comprise one or more models that have been trained to score and rank fields for use in pivot tables. Natural language processing models 140 may comprise one or more statistical models, one or more clustering models, and/or one or more neural networks. In some examples, pivot table service 132 may receive user feedback related to generation of one or more pivot tables and train natural language processing models 140 based on whether that feedback was positive or negative. In examples where natural language processing models 140 comprise one or more neural networks, pivot table service 132 may train the one or more neural networks via back propagation. Thus, pivot table service 132 and natural language processing models 140 may include improved machine learning models that have been trained to identify fields that users are going to find useful in pivot tables. In some examples, natural language processing models 140 may identify a type of data (e.g., sales data, sport statistics data, financial data, geographic data) of the initial data set (e.g., the existing table in the software application or service) and identify relevant fields for inclusion in pivot tables based on that identification.

Turning to the specific example illustrated in FIG. 1, table 104 is displayed on client computing device 102A. Table 104 may be displayed in a spreadsheet application or service. In other examples, table 104 may comprise a table object from a first application or service (e.g., a spreadsheet application or service) that is embedded in a canvas of a different application or service (e.g., a word processing application or service, an email application or service, a presentation application or service). Table 104 is an expenses table for an exemplary business. Table 104 includes nine fields. Those fields are: year, quarter, month, country, code (e.g., country code), region, city, category, and amount. Each of those fields has a plurality of values associated with it. As illustrated and described in relation to FIG. 3, the year field has a cardinality value of 10, the quarter field has a cardinality value of 4, the month field has a cardinality value of 12, the country field has a cardinality value of 2, the code field has a cardinality value of 2, the region field has a cardinality value of 5, the city field has a cardinality value of 21, the category field has a cardinality value of 5, and the amount field has a cardinality value of 8,281.

In this example, an indication to generate a pivot table from table 104 is received via a natural language user input 108. In this example, the natural language input 108 is received via user experience element 106, which includes the text "What can I help you with?" A user has input the natural language input 108 "Pivot table of amount by region, code, category, city, country and year" in user experience element 106. User experience element 106 may be associated with the pivot table service 132, an artificial intelligence (AI) component of the application or service that table 104 is included in, and/or a digital assistant that may process natural language input 108. Although in this example, the indication to generate a pivot table is received via a natural language user input, as described above, an indication to generate a pivot table may comprise various mechanisms, including highlighting or otherwise selecting a portion of a table and inputting a command to a computing device to generate a pivot table, using a pivot table assistant or tool, dragging and dropping fields into pivot table assistant or tool, and/or a pivot table assistant automatically recommending pivot tables based on one or more criteria (e.g., time, interaction with one or more application/service elements).

Pivot table service 132 receives natural language input 108 and processes it with task intent machine learning models 142. Pivot table service 132 determines based on that processing that natural language input 108 includes an intent to generate a pivot table from table 104. Task intent machine learning models 142 and/or one or more other language processing models (e.g., natural language processing models 140) may identify and/or extract fields from natural language input 108 that are to be included in the pivot table that is going to be generated. In this example, a determination is made that amount, region, code, category, city, country and year fields are to be included in the pivot table.

Pivot table service 132 may determine whether each of the fields that are included in the pivot table are associated with measure values or dimension values. The pivot table service 132 may remove fields associated with measure values from inclusion in the columns or rows of a pivot table that is being generated, while including the dimension values for inclusion as columns or rows of a pivot table that is being generated. In this example, pivot table service 132 determines that the amount field is associated with measure values, and each of the remaining fields (e.g., region, code, category, city, country, year) that were identified from natural language input 108 are associated with dimension values. As such, pivot table service 132 excludes the amount field from being processed for inclusion in the rows or columns of the pivot table that is being generated.

Pivot table service 132 may process the remaining fields with cardinality engine 134, relationship engine 136, and field ordering engine 138 as further described in relation to FIGS. 2-11. Based on that processing, pivot table service 132 generates pivot table 148, which includes the category field populated in the columns. The rows of pivot table 148 are populated from top to bottom in the following field order: year, code, country, region, city.

Figure 2:
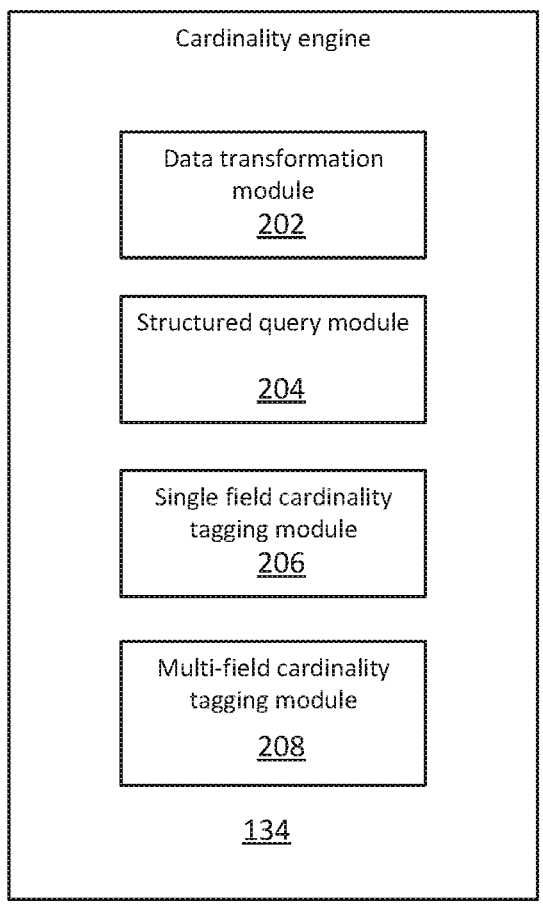
FIG. 2 is a block diagram illustrating an exemplary cardinality engine.

FIG. 2 is a block diagram illustrating an exemplary cardinality engine 134. Cardinality engine 134 includes data transformation module 202, structured query module 204, single field cardinality module 206, and multi-field cardinality module 208. Cardinality engine 134 may perform operations associated with determining cardinality values for individual fields of a table and for combinations of fields of a table.

Data transformation module 202 may receive field and value data from an existing table in a software application or service. In some examples, data transformation module 202 may process the entirety of the table data. In other examples, data transformation module 202 may only process field and value data for fields that the pivot table service 132 has determined are to be included in a pivot table that is going to be generated. For example, if a determination is made that only two fields of a ten field table are to be included in a pivot table, processing resources may be conserved by only processing the two fields and their associated values rather than all ten fields and their associated values. Additionally, in some examples, where large tables are involved, data transformation module 202 and/or cardinality engine 134 may only process data for a threshold number or percentage of rows (e.g., first 10,000 rows, first 15,000 rows). Other strategies for processing a subset of data in large tables may be utilized. For example, data from every third, fifth, tenth, or X number of rows may be analyzed. In additional examples, if a determination is made that table data is sorted (or likely sorted), the pivot table service 132 may not analyze the first Y number of rows for a large table. Rather, the pivot table service 132 may analyze a random row in a block of rows. In some examples, the threshold may be dynamic and associated with network conditions, amount of data in a processing queue, and/or processing resources of one or more computing devices processing the data. Data transformation module 202 may receive the existing table data in a first form (e.g., the existing table form) and transform it to a SQL format. The transformed data may be stored in a data store, such as pivot table data store 146.

Structured query module 204 may generate and process one or more structured queries to determine cardinality values corresponding to a number of instances of unique values for each of a plurality of fields of the table that have been identified for inclusion in the pivot table that is being generated. Those cardinality values may be associated with each corresponding field by single field cardinality tagging module 206. The association may comprise tagging the field with metadata indicating the cardinality value or associating a cardinality value with each field in the SQL format. Structured query module 204 may also generate and process one or more structured queries to determine cardinality values corresponding to a number of unique values for combinations of each set of fields that have been identified for inclusion in the pivot table that is being generated. That is, structured query module 204 may further determine the unique number of combinations of each field to each other field that is to be included in the pivot table. These combined cardinality values may be associated with each corresponding set of fields by multi-field cardinality tagging module 208. The association may comprise tagging each member of the set of fields with metadata indicating the cardinality value for the set or associating a cardinality value with each field of the set in the SQL format.

Figure 3:
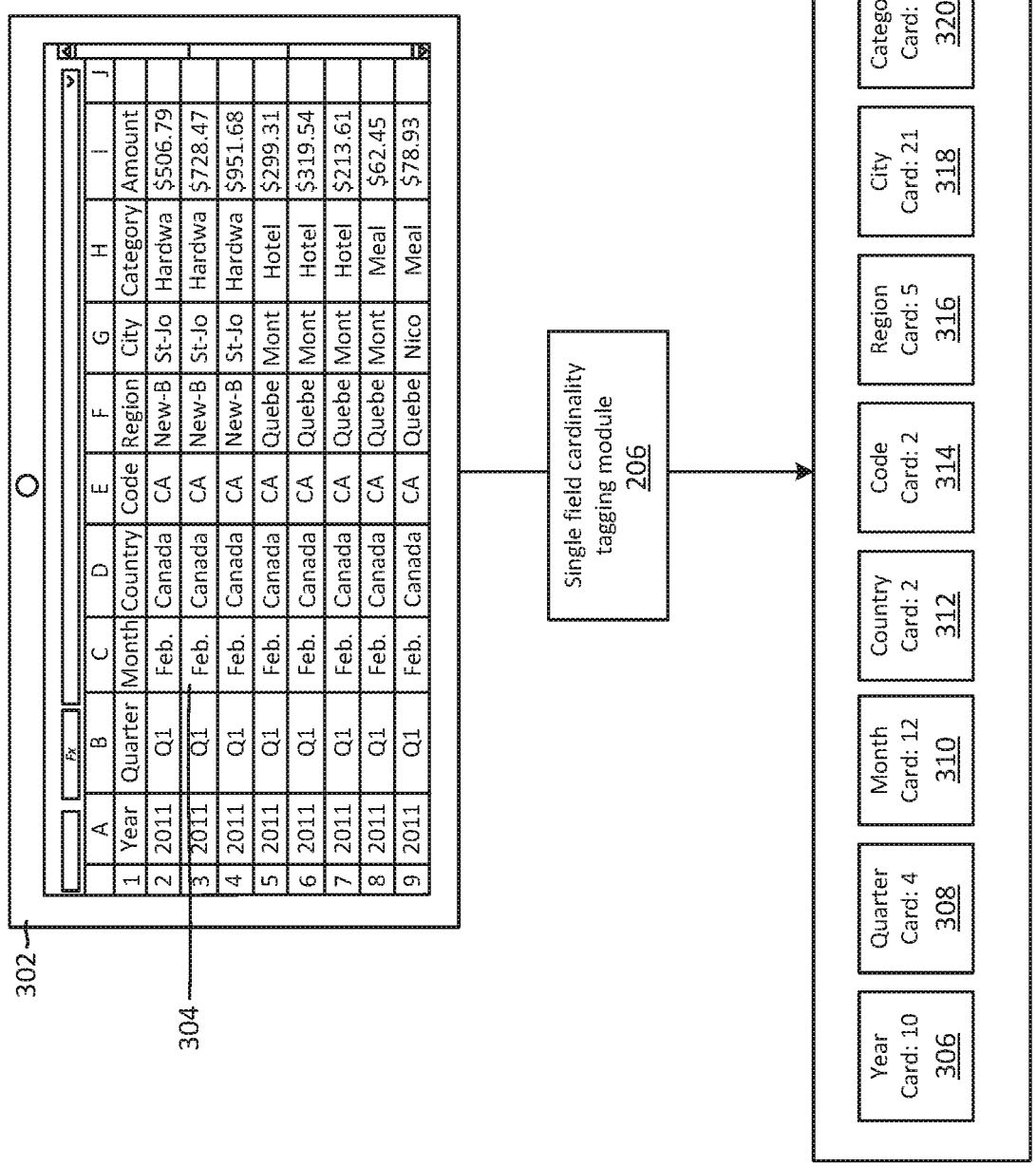
FIG. 3 is a diagram illustrating the processing of a table in a software application with a single field cardinality tagging module associated with a pivot table service.

FIG. 3 is a diagram illustrating the processing of a table 304 in a software application with a single field cardinality tagging module 206 associated with a pivot table service. In this example, client computing device 302 displays table 304, which is the same table as table 104 in FIG. 1. Table 304 is processed with single field cardinality tagging module 206, which in this example determines cardinality values for each of the fields included in table 304. However, as described above, in some examples cardinality engine 134 may only process table data and determine cardinality values for fields that are identified for inclusion in a pivot table that is being generated. In this example, cardinality engine 134 identifies the cardinality values for each of the fields (e.g., year, quarter, month, country, code, region, city, category, amount) included in table 304. Single field cardinality tagging module 206 then associates cardinality values 305 with each of those fields. Specifically, year element 306 indicates that the year field has a cardinality value of 10, quarter element 308 indicates that the quarter field has a cardinality value of 4, month element 310 indicates that the month field has a cardinality value of 12, country element 312 indicates that the country field has a cardinality value of 2, code element 314 indicates that the code field has a cardinality value of 2, region element 316 indicates that the region field has a cardinality value of 5, city element 318 indicates that the city field has a cardinality value of 21, category element 320 indicates that the category field has a cardinality value of 5, and amount element 322 indicates that the amount field has a cardinality value of 8,281.

Figure 4:
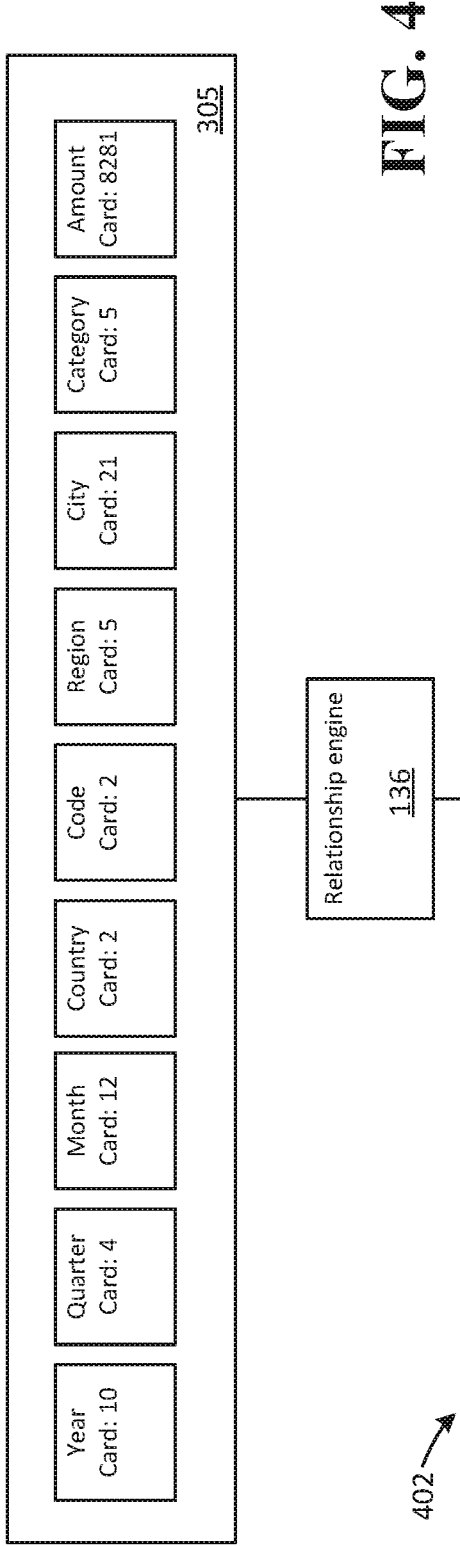
FIG. 4 is a block diagram illustrating the processing of cardinality data for a plurality of fields by a relationship engine associated with a pivot table service.

FIG. 4 is a block diagram illustrating the processing of cardinality data (e.g., cardinality values 305) for a plurality of fields by a relationship engine 136 associated with a pivot table service. The computed cardinality relationships between fields are illustrated by table 402. Although the cardinality relationships are illustrated in a table, it should be understood that the pivot table service 132 may store the cardinality values in various forms (e.g., cached data, SQL database, different storage devices, compressed format, metadata). The cardinality relationships between fields included in the table correspond to row field to column field relationships. The rows include, from top to bottom of table 402: year, quarter, month, country, code, region, city, and category. The columns include, from left to right, year, quarter, month, country, code, region, city, category. The cardinality relationships between fields may be determined via relationship engine 136. In some examples, the cardinality relationships between fields may be determined via the following rules.

If cardAB=cardA=cardB, then the relationship between field A and field B is 1-to-1.

If cardAB=max(cardA, cardB), then the relationship between field A and field B is 1-to-N if max(cardA, cardB)=cardB and N-to-1 otherwise.

If cardAB>max(cardA, cardB), then the relationship between field A and field B is N-to-N.

As described in relation to FIG. 1, in some examples, rather than applying a strict 1-to-N rule as defined above, the relationship engine 136 may apply a cardinality relationship rule that takes into account scenarios where a data set may include multiple values that would semantically make sense at a 1-to-N relationship, but based on the strict rule criteria above would be classified as an N-to-N relationship. This is illustrated by the asterisk in table 402 on the intersection of city-to-region and region-to-city. Thus, in some examples, the pivot table service 132 may treat weak N-to-N relationships as 1-to-N relationships to provide for generation of pivot tables that are semantically and hierarchically pleasing.

As illustrated in table 402, the year-to-quarter cardinality relationships is N-to-N, the year-to-month cardinality relationship is N-to-N, the year-to-country cardinality relationship is N-to-N, the year-to-code cardinality relationships is N-to-N, the year to city cardinality relationship is N-to-N, and the year-to-category cardinality relationship is N-to-N.

The quarter-to-year cardinality relationship is N-to-N, the quarter-to-month cardinality relationship is 1-to-N, the quarter-to-country cardinality relationship is N-to-N, the quarter-to-code cardinality relationship is N-to-N, the quarter-to-region cardinality relationship is N-to-N, the quarter-to-city cardinality relationship is N-N, and the quarter-to-category cardinality relationship is N-to-N.

The month-to-year cardinality relationship is N-to-N, the month-to-quarter cardinality relationship is N-to-1, the month-to-country cardinality relationship is N-to-N, the month-to-code cardinality relationship is N-to-N, the month-to-region cardinality relationship is N-to-N, the month-to-city cardinality relationship is N-to-N, and the month-to-category cardinality relationship is N-to-N.

The country-to-year cardinality relationship is N-to-N, the country-to-quarter cardinality relationship is N-to-N, the country-to-month cardinality relationship is N-to-N, the country-to-code cardinality relationship is 1-to-1, the country-to-region cardinality relationship is 1-to-N, the country-to-city cardinality relationship is 1-to-N, and the country-to-category relationship is N-to-N.

The code-to-year cardinality relationship is N-to-N, the code-to-quarter cardinality relationship is N-to-N, the code-to-month cardinality relationship is N-to-N, the code-to-country cardinality relationship is 1-to-1, the code-to-region cardinality relationship 1-to-N, the code-to-city cardinality relationship is 1-to-N, and the code-to-category cardinality relationship is N-to-N.

The region-to-year cardinality relationship is N-to-N, the region-to-quarter cardinality relationship is N-to-N, the region-to-month cardinality relationship is N-to-N, the region-to-country cardinality relationship is N-to-1, the region-to-code cardinality relationship is N-to-1, and the region-to-category cardinality relationship is N-to-N. As discussed above, the region-to-city relationship in this example is strictly a weak N-to-N relationship because there is at least one city name that appears in two or more regions. However, the relationship engine 136 accounts for these weak relationships (e.g., via application of a ratio and threshold as discussed above in relation to FIG. 1). As such, the relationship engine associates a 1-to-N cardinality relationship between region and city.

The city-to-year cardinality relationship is N-to-N, the city-to-quarter cardinality relationship is N-to-N, the city-to-month cardinality relationship is N-to-N, the city-to-country cardinality relationship is N-to-1, the city-to-code cardinality relationship is N-to-1, and the city-to-category cardinality relationship is N-to-N. For the same reasons as discussed above with regard to the region-to-city cardinality relationship, the city-to-region cardinality relationship, which would otherwise be a weak N-to-N relationship, is converted to a N-to-1 relationship to maintain hierarchical and semantic cohesion.

The category-to-year cardinality relationship is N-to-N, the category-to-quarter cardinality relationship is N-to-N, the category-to-month cardinality relationship is N-to-N, the category-to-country cardinality relationship is N-to-N, the category-to-code cardinality relationship is N-to-N, the category-to-region cardinality relationship is N-to-N, and the category-to-city cardinality relationship is N-to-N.

The cardinality relationships may be utilized by field ordering engine 138 to determine how to order the fields that are going to be included in a pivot table that is being generated as further discuss herein (e.g., in relation to FIGS. 1 and 6-11).

Figure 5:
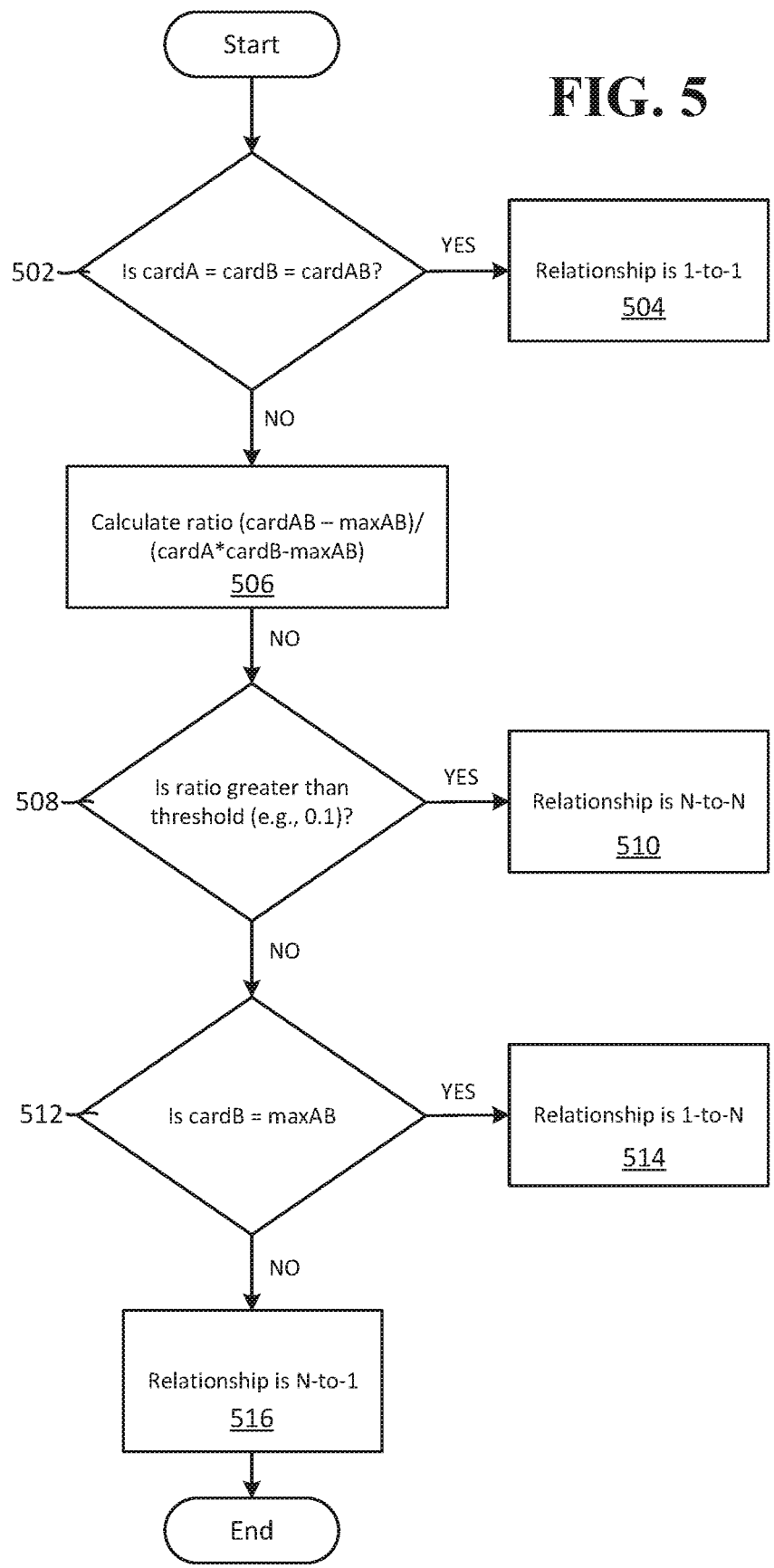
FIG. 5 is an exemplary method 500 for determining a cardinality relationship between a first field and a second field.

FIG. 5 is an exemplary method 500 for determining a cardinality relationship between a first field and a second field. The operations described in relation to method 500 may be performed by pivot table service 132 and/or relationship engine 136. The cardinality relationship being determined is the relationship of a first field (e.g., field A) to a second field (e.g., field B), which are illustrative of any fields of an existing table in a software application that may be analyzed for inclusion in a pivot table that is being generated by pivot table service 132.

At operation 502 a determination is made as to whether the cardinality of field A is equal to the cardinality of field B and whether the cardinality of field B is equal to the cardinality of fields A and B combined. The cardinality of fields A and B combined comprises a number of unique combinations of those two fields included in the dataset (e.g., the existing table) If a determination is made at operation 502 that the cardA=cardB=cardAB, then flow moves to operation 504 and the cardinality relationship of field A to field B is a 1-to-1 relationship. Alternatively, if a determination is made at operation 502 that cardA does not equal cardB or cardB does not equal cardAB, then flow moves to operation 506.

At operation 506 a ration is calculated. Specifically, the ratio that is calculated is (cardAB−maxAB)/(cardA*cardB−maxAB). The maxAB function takes the arguments cardA and cardB and returns the field with the greater cardinality value. The ratio calculated at operation 506 in combination with operation 508 accounts for weak N-to-N relationships as discussed above. From operation 506 flow continues to operation 508.

At operation 508 a determination is made as to whether the ratio/value calculated at operation 508 is greater than a threshold value (e.g., 0.1, 0.2, 0.3). If a determination is made at operation 508 that the ratio/value calculated at operation 506 is greater than the threshold value, flow moves to operation 510 and the cardinality relationship of field A to field B is an N-to-N relationship. Alternatively, if a determination is made at operation 508 that the ratio/value calculated at operation 506 is less than the threshold value, flow moves to operation 512.

At operation 512 a determination is made as to whether the cardinality value of field B is equal to maxAB. If at operation 512 a determination is made that the cardinality value of field B is equal to maxAB then flow moves to operation 514 where a determination is made that the relationship of field A to field B is 1-to-N. Alternatively, if a determination is made at operation 512 that the cardinality value of field B is not equal to maxAB then flow moves to operation 516.

At operation 516 a determination is made that the cardinality relationship of field A to field B is an N-to-1 relationship.

From operation 516 flow moves to an end operation and the method 500 ends.

Figure 6:
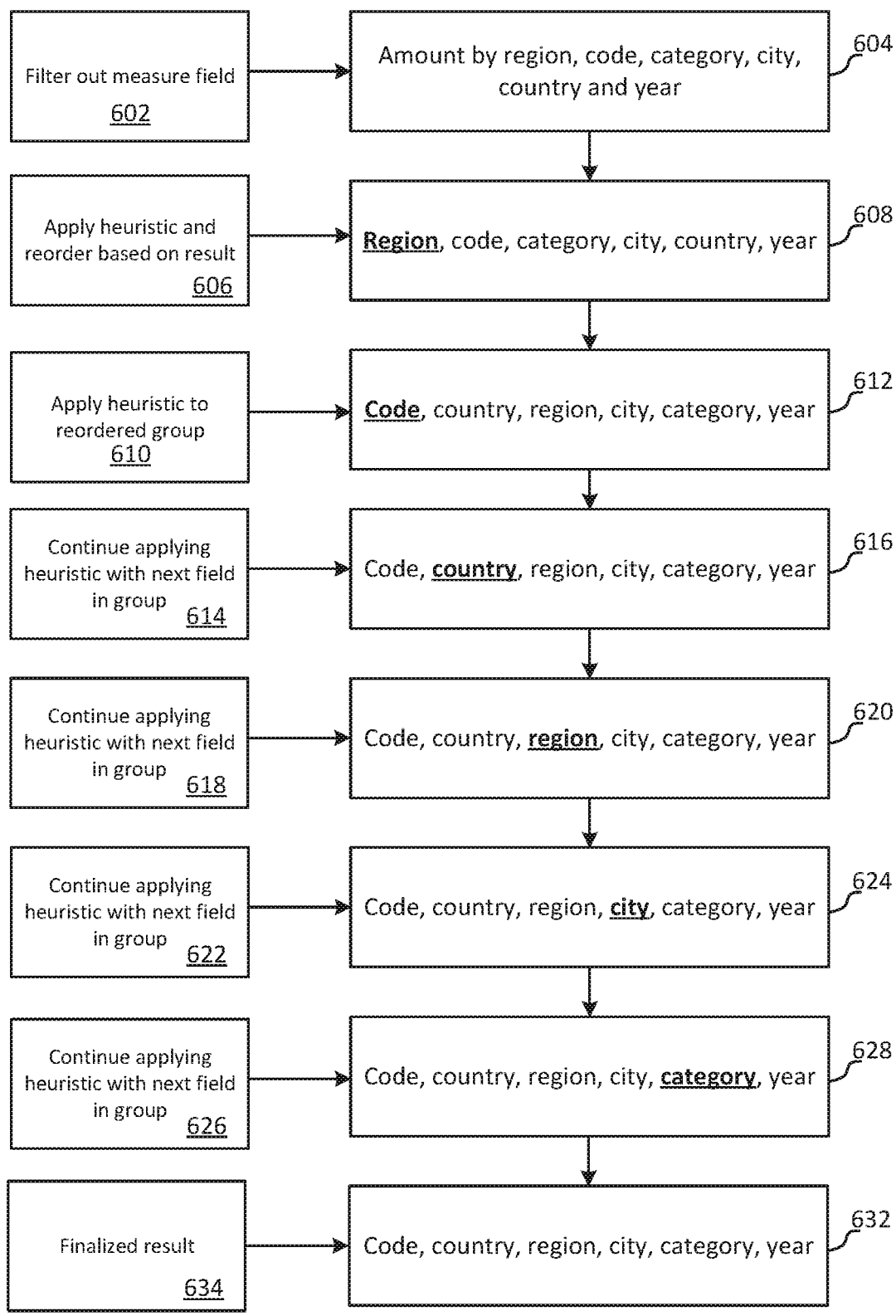
FIG. 6 is an exemplary block diagram illustrating the transformation of a plurality of fields in a first order to a semantic hierarchical order utilizing a field ordering engine.
Figure 7:
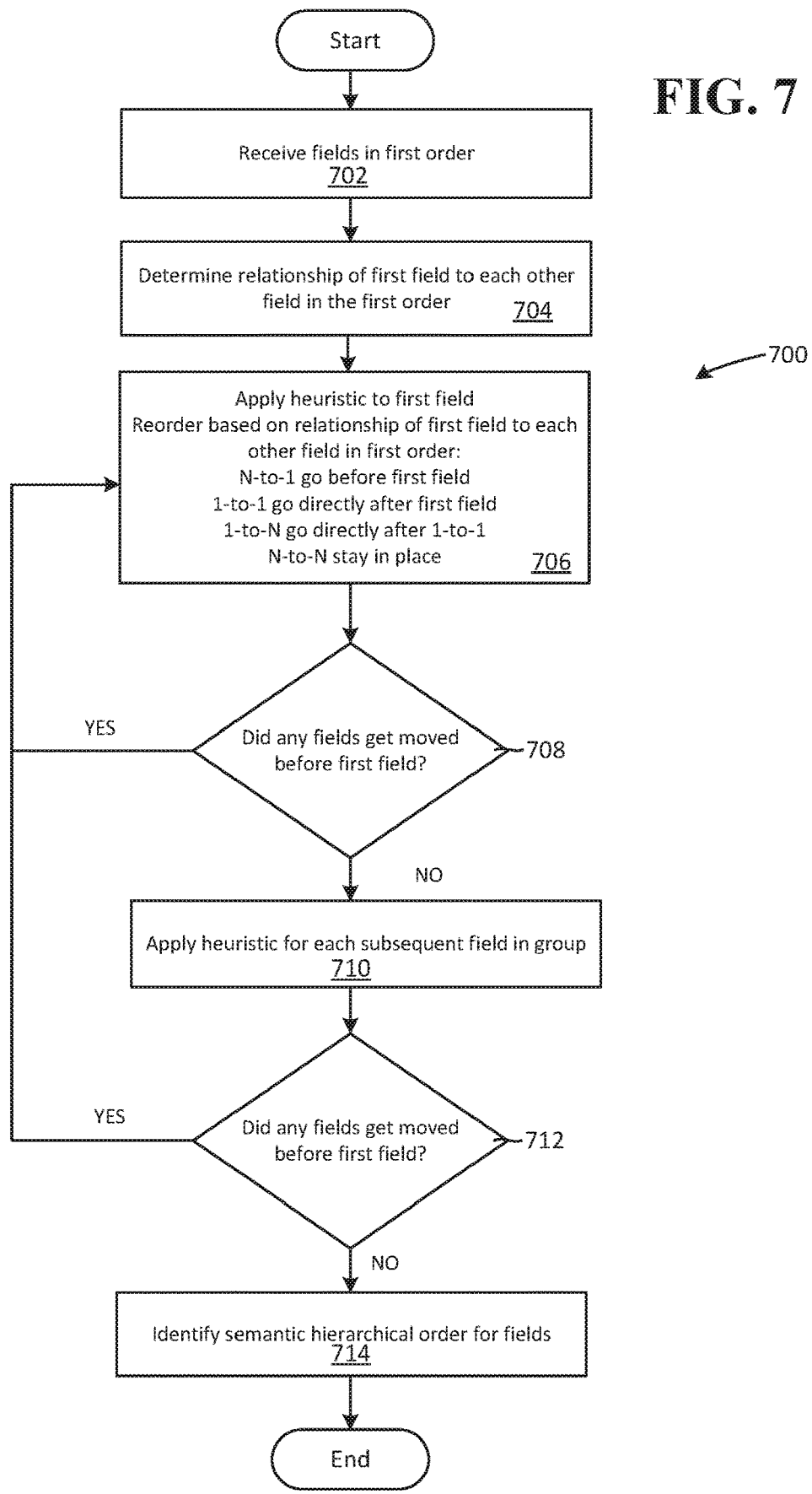
FIG. 7 is an exemplary method for transforming a plurality of fields in a first order to a semantic hierarchical order.

FIG. 6 is an exemplary block diagram 600 illustrating the transformation of a plurality of fields in a first order to a semantic hierarchical order utilizing a field ordering engine 138. FIG. 6 is described in relation to FIG. 7 for ease of illustration. FIG. 7 is an exemplary method 700 for transforming a plurality of fields in a first order to a semantic hierarchical order.

A determination has been made by pivot table service 132 that a plurality of fields of an existing table in a software application are indicated for inclusion in a pivot table. The existing table in this example is table 104. As illustrated by block 604, the fields indicated for inclusion in the pivot table are amount, region, code, category, city, country and year. As indicated by block 602, a filter is applied the fields to filter out any measure value fields from further processing. In this example, the amount field is determined to be a measure value field and as such that field is filtered out from further processing. The remainder of the fields (region, code, category, city, country, year) are dimension value fields and further processed.

Moving to block 608 the fields are received in a first order. That first order is region, code, category, city, country, year. As illustrated by block 606 a heuristic is applied to the fields in the first order to transform the plurality of fields from the first order to a semantic hierarchical order. The heuristic comprises a set of cardinality relationship rules. The heuristic that is applied is illustrated and described in relation to FIG. 7. The method 700 begins at a start operation and flow moves to operation 702.

At operation 702 a plurality of fields are received in a first order (e.g., the order included in block 608—region, code, category, city, country, year). From operation 702 flow moves to operation 704.

At operation 704 a determination is made as to a relationship of the first field in the first order as to each other field in the first order. In the example of FIG. 6, region and code have a N-to-1 relationship, region and category have a N-to-N relationship, region and city have a 1-to-N relationship, region and country have a N-to-1 relationship, and region and year have a N-to-N relationship.

From operation 704 flow moves to operation 706 where the heuristic/cardinality relationship rules are applied to the relationships determined between the first field and each other field in the first order. The heuristic/cardinality relationship rules are applied to transform the fields from the first order to a semantic hierarchical order. In some examples, the semantic hierarchical order may comprise fields having N-to-1 relationships before fields having 1-to-1 relationships, before fields having 1-to-N relationships, before fields having N-to-N relationships.

At operation 708 a determination is made as to whether any fields were moved before the first field. If a determination is made that one or more fields were moved before the first field, flow moves back to operation 706 where the heuristic/cardinality relationship rules are applied to the relationships determined between the new first field and each other field. Alternatively, if at operation 708 a determination is made that no fields were moved before the first field, flow moves to operation 710 where the heuristic/cardinality relationship rules are applied to each subsequent field in the group/order.

From operation 710 flow moves to operation 712 where a determination is made as to whether any fields were moved before the first field. If a determination is made that one or more fields were moved before the first field, flow moves back to operation 706 where the heuristic/cardinality relationship rules are applied to the relationships determined between the new first field and each other field. Alternatively, if at operation 712 a determination is made that no fields were moved before the first field, flow moves to operation 714 where the semantic hierarchical order for the fields is identified.

Moving back to FIG. 6, as illustrated by block 612, the code field has been moved before the region field because there was a N-to-1 relationship between region and code. There is a N-to-N relationship between region and category so category is left where it is in the order. There is a 1-to-N relationship between region and city so city gets moved right after region in the order. There is a N-to-1 relationship between region and country so country is moved right before region in the order. There is a N-to-N relationship between region and year so the year field is left where it is in the order.

Because at least one field was moved before the first field in the first order (region), the heuristic/cardinality relationship rules are applied to that order as illustrated by block 610 and operation 708, with code being the new starting field.

Otherwise, the heuristic/cardinality relationship rules would be applied to the next field in the list.

Code and country have a 1-to-1 relationship, so neither field is moved because those fields are already next to each other. Code and region have a 1-to-N relationship. Region is right after the 1-to-1 relationship, so it is already at the right place in the order and it is not moved. Code and city have a 1-to-N relationship. City is already in the right place in the order since it would be moved right after the last known 1-to-N relationship—in this case region. Since city is already after region, nothing is done. Code and category have an N-to-N relationship so nothing is done. Code and year have an N-to-N relationship, so nothing is done.

The order did not change, as illustrated by block 616. The order is still code, country, region, city, category, year. No field was moved before the new first field (code), so the heuristic/cardinality relationship rules are applied (e.g., via operation 710) to that order starting with the next field in the list—country, as illustrated by block 614. Country and region have a 1-to-N relationship, so the order is maintained. Country and city have a 1-to-N relationship. City is already at the right place since it would be moved right after the last known 1-to-N relationship—in this case region. Since city is already after region in the order nothing is done. Country and category have a N-to-N relationship, so nothing is done. Country and year have a N-to-N relationship, so nothing is done.

The order did not change, as illustrated by block 620. The order is still code, country, region, city, category, year. No field was moved before the first field (code), so the heuristic/cardinality relationship rules are applied (e.g., via operation 710) to that order starting with the next field in the list—region, as illustrated by block 618. Region and city have a 1-to-N relationship, so no re-ordering is done since region and city are next to one another. Region and category have an N-to-N relationship, so no fields are reordered. Region and year have a N-to-N relationship, so no fields are reordered.

The order did not change, as illustrated by block 624. The order is still code, country, region, city, category, year. No field was moved before the first field (code), so the heuristic/cardinality relationship rules are applied (e.g., via operation 710) to that order starting with the next field in the list—city, as illustrated by block 622. City and category have a N-to-N relationship, so no fields are reordered. City and year have a N-to-N relationship, so no fields are reordered.

The order did not change, as illustrated by block 628. The order is still code, country, region, city, category, year. No field was moved before the first field (code), so the heuristic/cardinality relationship rules are applied (e.g., via operation 710) to that order starting with the next field in the list—category, as illustrated by block 626. Category and year have a N-to-N relationship, so no fields are reordered.

The fields have now been transformed from the first order to a semantic hierarchical order, as illustrated by block 632. The semantic hierarchical order in this example is code, country, region, city, category, year. This order is identified/finalized (e.g., via operation 714) as illustrated by block 634.

Figure 8:
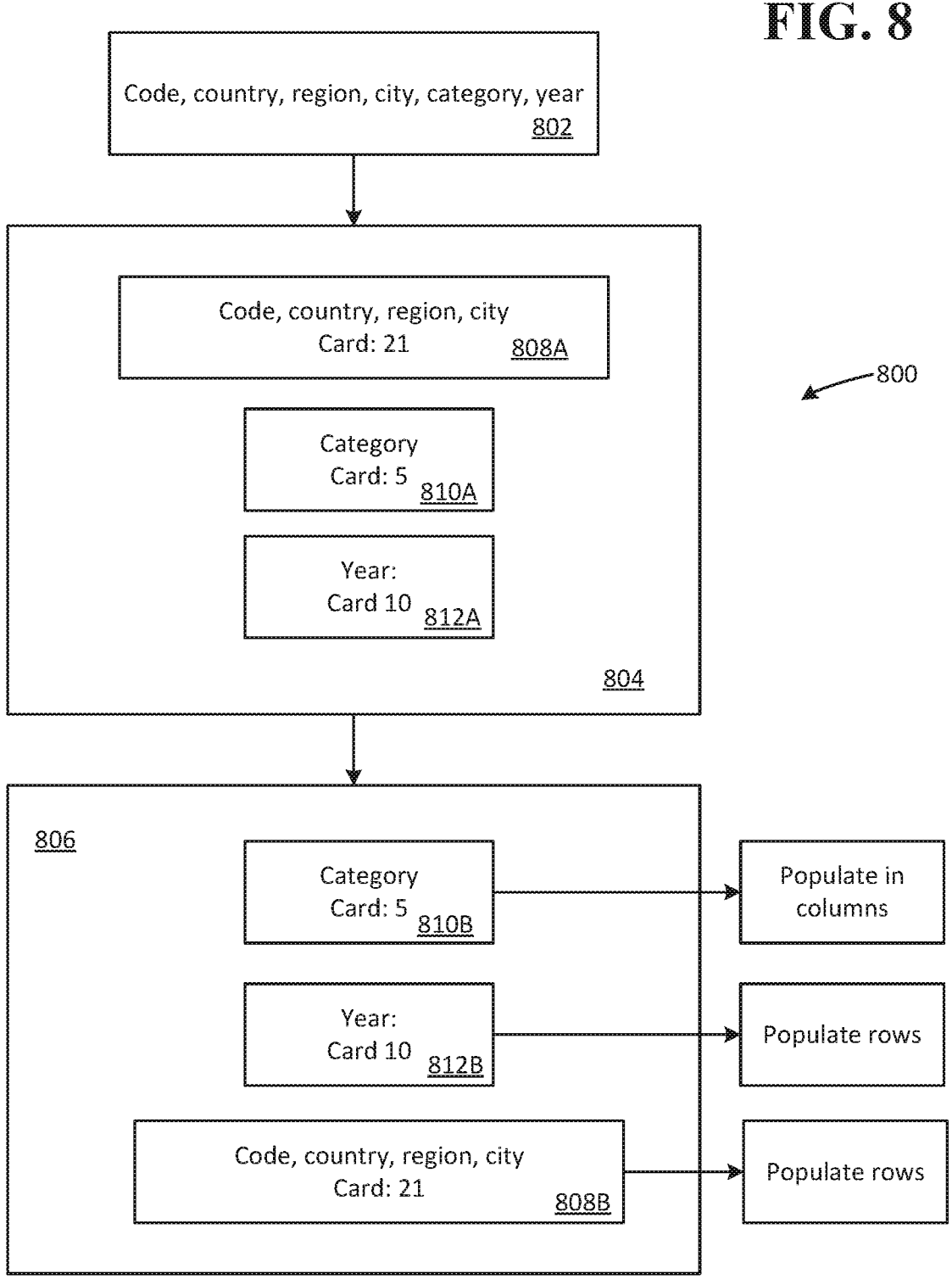
FIG. 8 is an exemplary block diagram illustrating the identification of a plurality of blocks included in a plurality of fields in a semantic hierarchical order, and the ordering of those blocks based on a cardinality value of each of the plurality of blocks for use in populating columns and rows of a pivot table.
Figure 9:
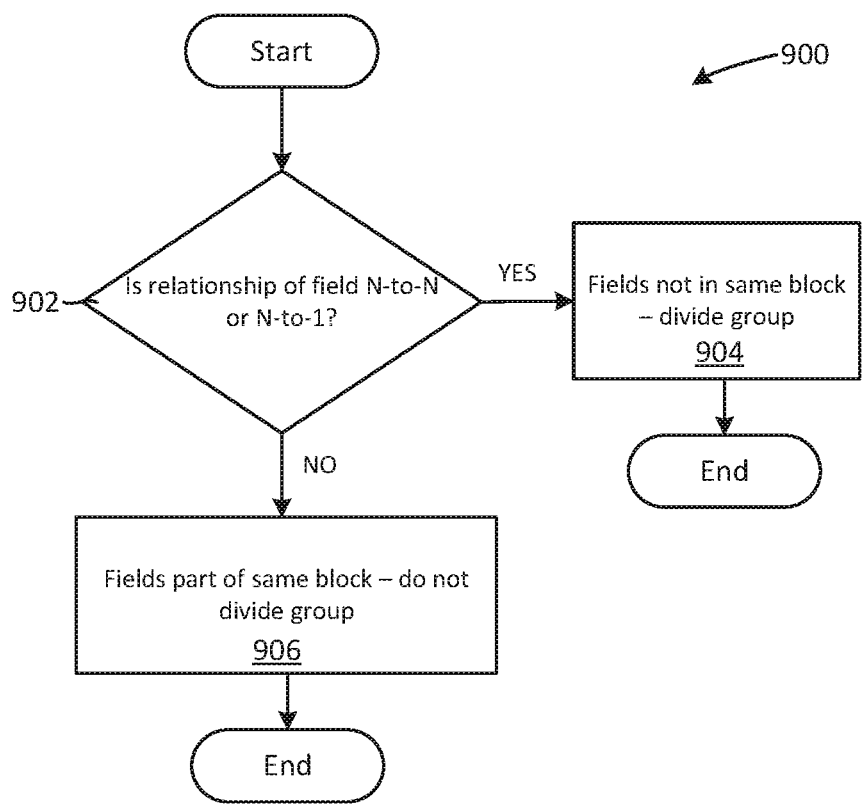
FIG. 9 is an exemplary method for identifying blocks from fields organized in a semantic hierarchical order.

FIG. 8 is an exemplary block diagram 800 illustrating the identification of a plurality of blocks included in a plurality of fields in a semantic hierarchical order, and the ordering of those blocks based on a cardinality value of each of the plurality of blocks for use in populating columns and rows of a pivot table. FIG. 8 is described in relation to FIG. 9 for ease of illustration. FIG. 9 is an exemplary method 900 for identifying blocks from fields organized in a semantic hierarchical order.

The identified/finalized order of the fields from FIG. 6 are illustrated by element 802 in the semantic hierarchical order. The semantic hierarchical order included in element 802 is code, country, region, city, category, year. The method 900 is applied to the fields in that hierarchical order. The method 900 begins at a start operation and flow moves to operation 902.

At operation 902 a determination is made as to whether a relationship between each consecutive field in the semantic hierarchical order is an N-to-N or an N-to-1 relationship. If at operation 902 a determination is made that consecutive fields in the semantic hierarchical order have an N-to-N relationship or an N-to-1 relationship, flow moves to operation 904 and those fields and the fields in the semantic hierarchical order are split at that intersection into different blocks. From operation 904 flow moves to an end operation and the method 900 ends unless there are additional fields in the group, in which case flow moves back to operation 902.

Alternatively, if at operation 902 a determination is made that consecutive fields in the semantic hierarchical order do not have an N-to-N relationship or an N-to-1 relationship, flow moves to operation 906 and a determination is made that those fields are part of the same block and therefore the group of fields is not divided into different blocks at that intersection. From operation 906 flow moves to an end operation and the method 900 ends unless there are additional fields in the group, in which case flow moves back to operation 902.

Moving back to FIG. 8, code and country have a 1-to-1 relationship (not N-to-N or N-to-1), so at operation 906 a determination is made that those fields are part of the same block. Country and region have a 1-to-N relationship (not N-to-N or N-to-1), so at operation 906 a determination is made that those fields are part of the same block. Region and city have a 1-to-N relationship (not N-to-N or N-to-1), so at operation 906 a determination is made that those fields are part of the same block.

City and category have an N-to-N relationship, so at operation 904 that intersection denotes a break in the group of fields. Category and year also have an N-to-N relationship, so at operation 904 that intersection also denotes a break in the group of fields. As such, as illustrated by blocks 804, first block 808A, second block 810A, and third block 812A are identified and/or generated by pivot table service 132. First block 808A includes ordered fields code, country, region, and city. First block 808A has a cardinality value of 21. Second block 810A includes the field category, which has a cardinality value of 5. Third block 812A includes the field year, which has a cardinality value of 10.

Pivot table service 132 may identify a block order of the blocks (e.g., block 808A, block 810A, block 812A), or arrange the blocks in a block order. The block order is based on a cardinality value of each of the plurality blocks. In the example of FIG. 8, the blocks 804 are ordered in ascending order as illustrated by block order 806. In block order 806 second block 812B corresponding to the category field has the lowest cardinality value (5) so it is ordered to the first position in the block order 806. Third block 808B corresponding to the year field has the second lowest cardinality value (10) so it is ordered to the second position in the block order 806. First block 808B corresponding to the code, country, region and city fields has the highest cardinality (21) so it is ordered to the last position in the block order 806.

Once the blocks 804 have been arranged in a block order 806, the pivot table service may populate columns and rows of a pivot table based on the block order as described in more detail below in relation to FIG. 10.

Figure 10:
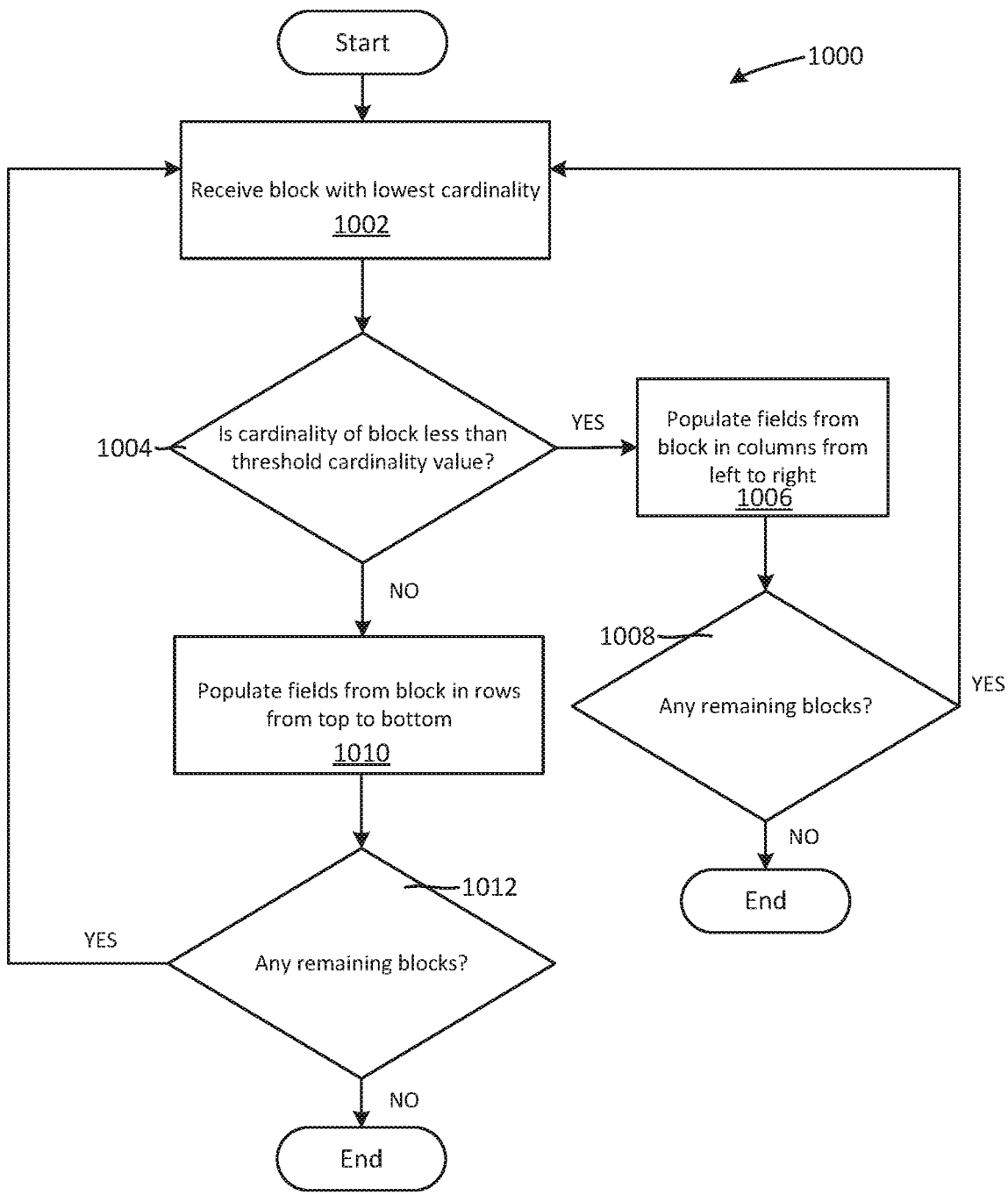
FIG. 10 is an exemplary method for intelligently populating columns and rows of a pivot table utilizing blocks comprised of semantically ordered fields.

FIG. 10 is an exemplary method 1000 for intelligently populating columns and rows of a pivot table utilizing blocks comprised of semantically ordered fields. The method 1000 begins at a start operation and flow moves to operation 1002.

At operation 1002 a block having the lowest cardinality value is received. In the example of FIG. 8, second block 812 has the lowest cardinality value so it is received at operation 1002.

From operation 1002 flow moves to operation 1004 where a determination is made as to whether the cardinality value of the received block is less than a threshold cardinality value. The threshold cardinality value may be dynamic in nature and change based one or more of: a size of a display that the software application or service is displayed on, a size of an application window that the software application or service is rendered in, and a font size of one or more characters included in the existing table. Thus, in determining the threshold cardinality value, the pivot table service 132 may take into consideration the amount of available display size on a device and how much area is taken up by one or more objects on a display or user interface. The threshold cardinality value may be utilized to limit the amount of left to right scrolling required to view the pivot table that is being generated.

If at operation 1004 a determination is made that the cardinality value of the received block is less than the threshold cardinality value, flow moves to operation 1006 where the fields from the received block are populated as columns in the pivot table from left to right. In the example of FIG. 8 we will assume that the threshold cardinality value is 10 (although it could be smaller or larger as discussed above). Thus, because the cardinality value for second block 810 is lower than the threshold cardinality value, the category field is populated columns of the pivot table at operation 1006. This is illustrated by the category columns in pivot table 148 in FIG. 1.

In examples, once fields from a first block have been populated in the columns of a pivot table, all remaining fields/blocks may be populated in rows of the pivot table regardless of their cardinality values and the threshold cardinality value. This keeps the width of the pivot table to an easily navigable size. In examples where more than one block may be populated in the columns of a pivot table, the combined cardinality value for the two or more fields in the two or more blocks that are populated in the columns of the pivot table may not exceed the threshold cardinality value. Additionally, if the pivot table service 132 only identifies one block, the fields for that block may automatically be populated in the rows of the pivot table regardless of the cardinality value of that block or the threshold cardinality value.

From operation 1006 flow continues to operation 1008 where a determination is made as to whether there are any remaining blocks. In the example of FIG. 8, there are two more blocks remaining (e.g., third block 812 and first block 808). As such, flow moves back to operation 1002. However, if there are no more blocks remaining, flow would move to an end operation and the method 1000 would end.

The next block to be received at operation 1002 is third block 812 because it has the second highest cardinality value (e.g., cardinality value of 10). A determination is then made at operation 1004 as to whether the cardinality value of third block 812 is less than the threshold cardinality value. Because third block 812 does not have a cardinality value of less than the threshold cardinality value (e.g., in this example the cardinality value of third block 812 is 10 and the threshold cardinality value is 10), flow moves to operation 1010. However, as described above, in most examples, if fields from a block have already been populated in the columns of the pivot table, the remaining blocks/fields are populated in the rows of the pivot table regardless of their cardinality values or the threshold cardinality value.

At operation 1010 fields from blocks received that have a cardinality value above the threshold cardinality value are populated in rows of the pivot table from top to bottom. Thus, in the example of block 812 the year field is populated in the first row of the pivot table as illustrated in pivot table 148 in FIG. 1.

From operation 1010 flow moves to operation 1012 where a determination is made as to whether there are any remaining blocks. If there are no remaining blocks flow moves to an end operation and the method 100 ends. However, in examples where there are blocks remaining (as is the case in FIG. 8), flow moves back to operation 1002. In the example of FIG. 8 there is one more block remaining (first block 808).

Block 808 is the last block to be received at operation 1002 because block 808 has the highest cardinality value (e.g., cardinality value of 21). A determination is then made at operation 1004 as to whether the cardinality value of first block 808 is less than the threshold cardinality value. Because first block 808 does not have a cardinality value of less than the threshold cardinality value (e.g., in this example the cardinality value of first block 808 is 21 and the threshold cardinality value is 10), flow moves to operation 1010. Again, as described above, in most examples, if fields from a block have already been populated in the columns of the pivot table (as is the case in relation to FIG. 8), the remaining blocks/fields are populated in the rows of the pivot table regardless of their cardinality values or the threshold cardinality value.

At operation 1010 the fields from block 808 are populated in their order in the pivot table blow any previously populated rows. In this example, the pivot table rows are ordered with the code, country, region and city rows (in that order) below the year row, as illustrated by pivot table 148 in FIG. 1. A determination is then made at operation 1012 that there are no remaining blocks. As such, flow moves to an end operation and the method 1000 ends.

The pivot table that has been generated in relation to FIG. 8 is illustrated by pivot table 148 in FIG. 1.

Figure 11:
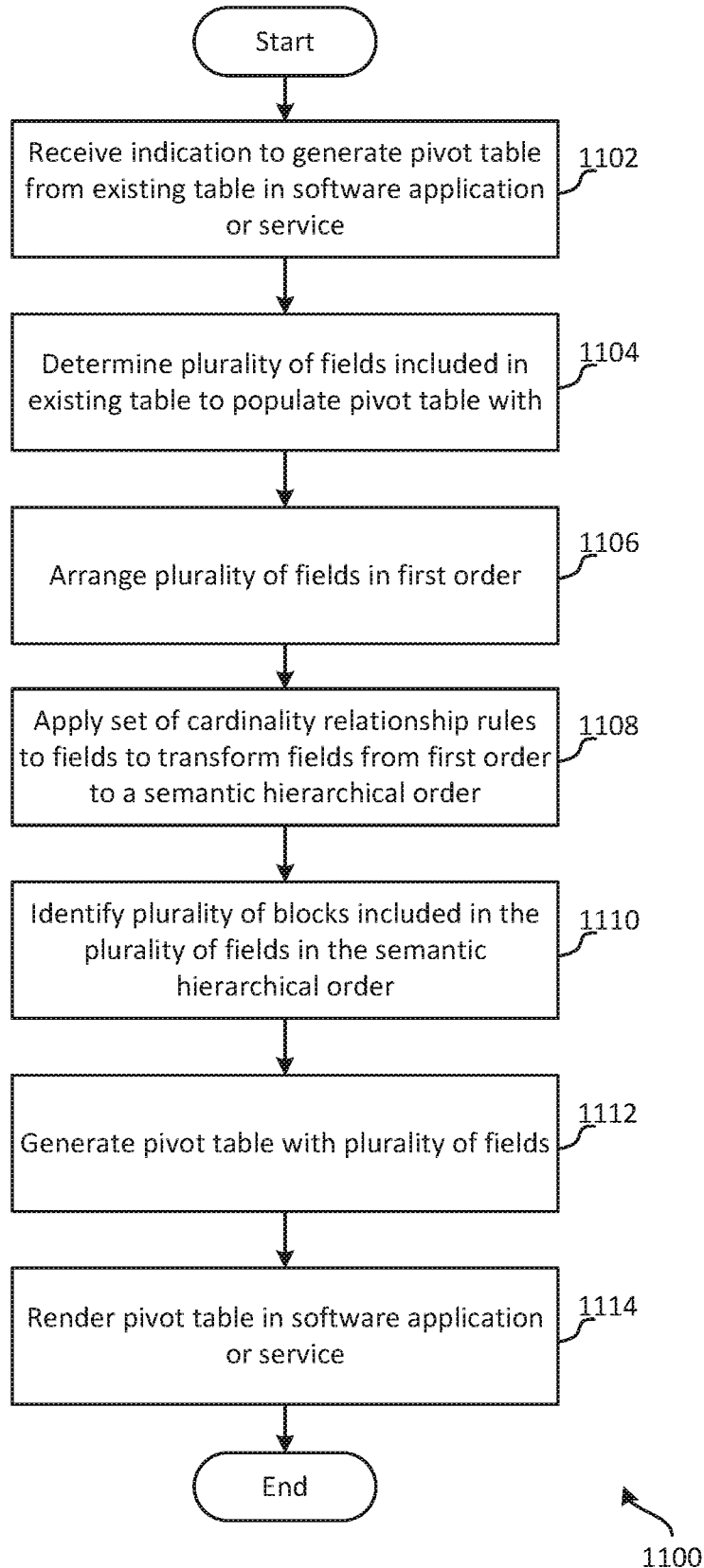
FIG. 11 is an exemplary method for intelligently generating a pivot table.

FIG. 11 is an exemplary method 1100 for intelligently generating a pivot table. The method 1100 begins at a start operation and flow moves to operation 1102.

At operation 1102 an indication to generate a pivot table from an existing table in a software application or service is received. In examples, receiving the indication may comprise processing of a natural language user input to an application or service that includes the existing table. In other examples, the indication may comprise processing a natural language user input by one or more other services (e.g., pivot table service 132, a digital assistant). In additional examples, the indication to generate the pivot table may be received via a selection of a portion of a dataset (e.g., via a cursor, via a voice input) and/or interaction with a menu (or another voice input) to generate a pivot table that includes the selected portion of the dataset. In additional examples, an indication to generate a pivot table from the existing table may be received via a pivot table user interface tool. In some examples, the pivot table user interface tool may include a user interface for dragging and dropping identifiers for one or more fields into a pivot table generation user interface element.

From operation 1102 flow continues to operation 1104 where a determination of a plurality of fields included in the existing pivot table to populate the pivot table with is made. In some examples, pivot table service 132 may apply one or more natural language processing models (e.g., natural language processing models 140) to determine the plurality of fields included in the existing table to populate the pivot table with. In other examples, a user may specify (e.g., via natural language input, via drag and drop, via manual selection) which of the plurality of fields to include in a pivot table that is being generated.

From operation 1104 flow continues to operation 1106 where the plurality of fields is arranged, in memory, in a first order. The first order may be determined based on a manual selection order by a user (e.g., an order corresponding to which fields were dragged and dropped into a pivot table generation user interface/tool, an order corresponding to field position in a language input from the user to generate a pivot table), and/or based on one or more rules (e.g., order fields left to right based on column position, order fields in alphabetical order).

From operation 1106 flow continues to operation 1108 where a set of cardinality relationship rules are applied to the plurality of fields to transform the plurality of fields from the first order to a semantic hierarchical order. Cardinality values for each of the fields may be determined. Cardinality values for sets of fields may also be determined. Cardinality relationships for each field of the plurality of fields that are to be included in the pivot table may then be determined. The cardinality relationships may comprise 1-to-1, 1-to-N, N-to-1, and N-to-N. In some examples, transforming the plurality of fields from the first order to a semantic hierarchical order may comprise arranging the fields with N-to-1 relationships before fields with 1-to-1 relationships, fields with 1-to-1 relationships being arranged before fields with 1-to-N relationships, and fields with 1-to-N relationships being arranged before fields with N-to-N relationships.

From operation 1108 flow continues to operation 1110 where a plurality of blocks included in the plurality of fields in the semantic hierarchical order are identified. To identify the blocks the pivot table service 132 may identify one or more consecutive fields in the semantic hierarchical order that comprise 1-to-1 cardinality relationships or 1-to-N cardinality relationships. Moving from the beginning of the semantic hierarchical order to the end of the semantic hierarchical order, a block will only include fields with 1-to-1 cardinality relationships and/or fields with 1-to-N cardinality relationships. Consecutive fields in the semantic hierarchical order with N-to-N relationships are broken into their own blocks at the intersection of those fields. Consecutive fields in the semantic hierarchical order with N-to-1 cardinality relationships are also broken into their own blocks at the intersection of those fields.

From operation 1110 flow continues to operation 1112 where the pivot table is generated with the plurality of fields. Generating the pivot table may comprise populating columns in the pivot table from fields included in one or more blocks of the plurality of blocks that have a cardinality value less than a threshold cardinality value, and populating rows in the pivot table from fields included in one or more blocks of the plurality of blocks that have a cardinality value that meets or exceeds the threshold cardinality value. Utilization of the threshold cardinality value limits how wide a pivot table becomes.

The combined cardinality value for fields that are populated in the columns of a pivot table is kept below the threshold cardinality value. This ensures that the width of the table is kept to an easily navigable size. In most examples, once a first block is identified for populating columns with, only fields from that block will be populated in the columns. In such examples, the cardinality value of each remaining block need not be compared to the threshold cardinality value because the fields in each remaining block will only be populated as rows in the pivot table.

From operation 1112 flow continues to operation 1114 where the pivot table is rendered in the software application or service. The pivot table may be rendered for display and/or audio output in the software application or service. In some examples, a user may provide feedback to the pivot table service 132 that indicates positive or negative sentiment in relation to one or more elements (e.g., field position in pivot table, fields included in pivot table). The feedback may be utilized by the pivot table service 132 to train one or more machine learning models that were utilized in selecting or positioning those one or more elements in the pivot table.

From operation 1114 flow moves to an end operation and the method 1100 ends.

Figure 12:
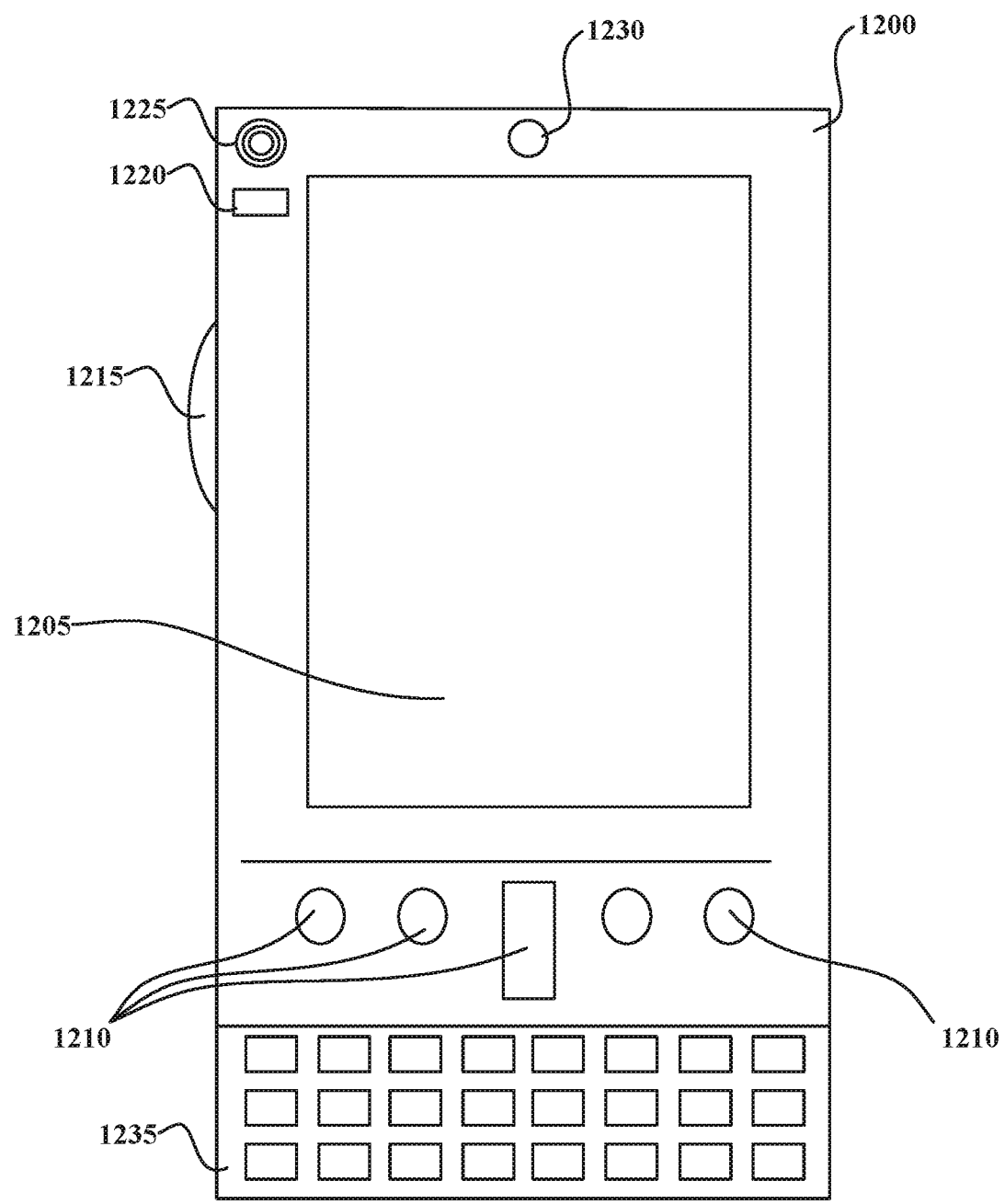
FIGS. 12 and 13 are simplified diagrams of a mobile computing device with which aspects of the disclosure may be practiced.
Figure 13:
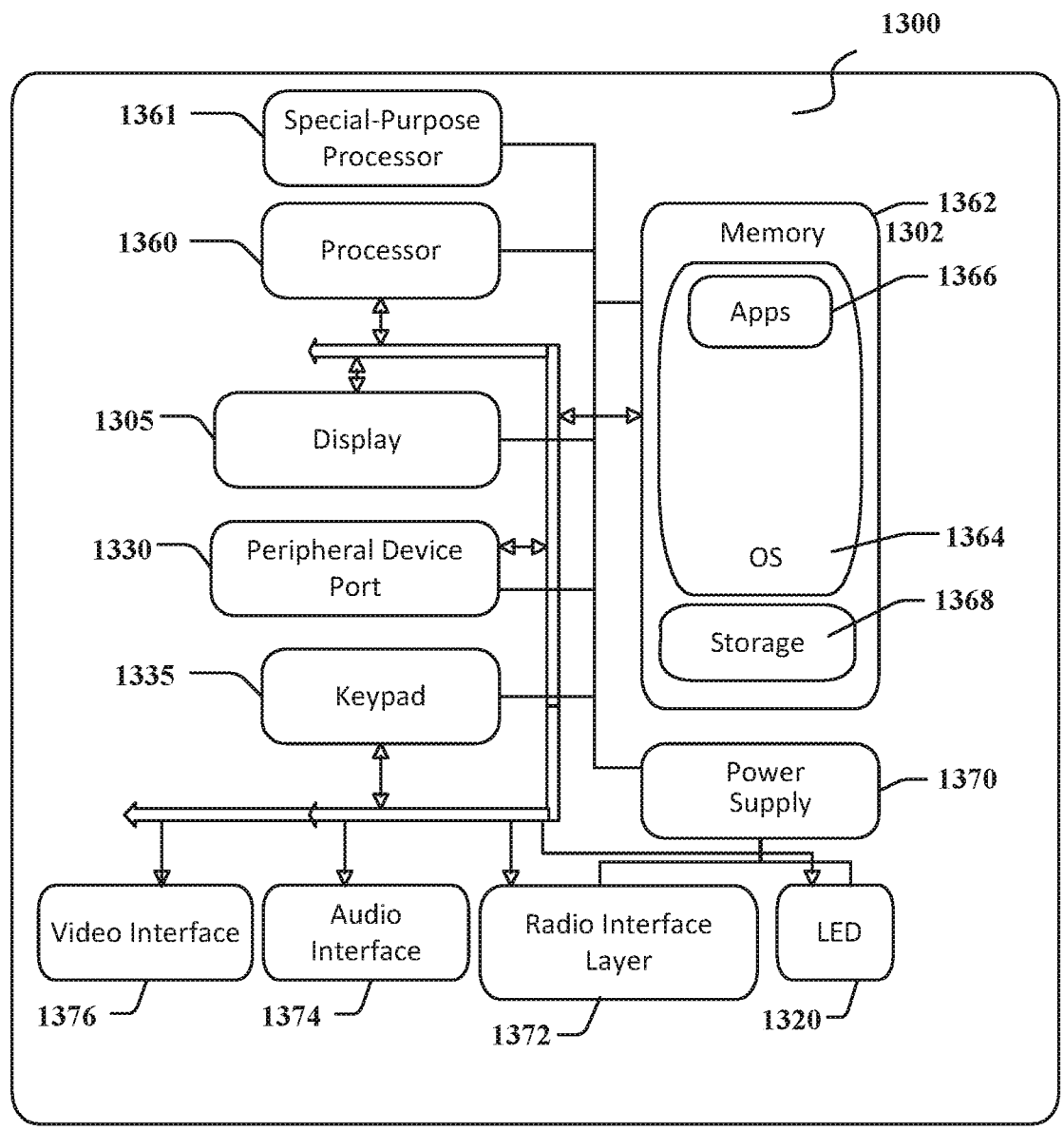

FIGS. 12 and 13 illustrate a mobile computing device 1200, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 12, one aspect of a mobile computing device 1200 for implementing the aspects is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative aspects, mobile computing device 1200 may incorporate more or fewer input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some aspects, the mobile computing device 1200 incorporates a vibration transducer for providing the user with tactile feedback. In yet another aspect, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 13 is a block diagram illustrating the architecture of one aspect of a mobile computing device. That is, the mobile computing device 1300 can incorporate a system (e.g., an architecture) 1302 to implement some aspects. In one embodiment, the system 1302 is implemented as a "smart phone" capable of running one or more applications (e.g., browser, e-mail, calendaring, contact managers, messaging clients, games, and media clients/players). In some aspects, the system 1302 is integrated as a computing device, such as an integrated personal digital assistant (PDA) and wireless phone. Mobile computing device 1300 includes special-purpose processor 1361, processor 1360, display 1305, peripheral device port 1330, keypad 1335, video interface 1376, audio interface 1374, radio interface layer 1372, LED and 1320, among other components described herein.

One or more application programs 1366 may be loaded into the memory 1362 and run on or in association with the operating system 1364. Examples of the application programs include phone dialer programs, e-mail programs, personal information management (PIM) programs, word processing programs, spreadsheet programs, Internet browser programs, messaging programs, and so forth. The system 1302 also includes a non-volatile storage area 1368 within the memory 1362. The non-volatile storage area 1368 may be used to store persistent information that should not be lost if the system 1302 is powered down. The application programs 1366 may use and store information in the non-volatile storage area 1368, such as e-mail or other messages used by an e-mail application, and the like. A synchronization application (not shown) also resides on the system 1302 and is programmed to interact with a corresponding synchronization application resident on a host computer to keep the information stored in the non-volatile storage area 1368 synchronized with corresponding information stored at the host computer. As should be appreciated, other applications may be loaded into the memory 1362 and run on the mobile computing device 1300, including instructions for providing and operating an asset disposition engine.

The system 1302 has a power supply 1370, which may be implemented as one or more batteries. The power supply 1370 might further include an external power source, such as an AC adapter or a powered docking cradle that supplements or recharges the batteries.

The system 1302 may also include a radio interface layer 1372 that performs the function of transmitting and receiving radio frequency communications. The radio interface layer 1372 facilitates wireless connectivity between the system 1302 and the "outside world," via a communications carrier or service provider. Transmissions to and from the radio interface layer 1372 are conducted under control of the operating system 1364. In other words, communications received by the radio interface layer 1372 may be disseminated to the application programs 1366 via the operating system 1364, and vice versa.

The visual indicator 1220 may be used to provide visual notifications, and/or an audio interface 1374 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1370 so that when activated, they remain on for a duration dictated by the notification mechanism even though the processor 1360, special-purpose processor 1361 and other components might shut down for conserving battery power. The LED may be programmed to remain on indefinitely until the user takes action to indicate the powered-on status of the device. The audio interface 1374 is used to provide audible signals to and receive audible signals from the user. For example, in addition to being coupled to the audio transducer 1225, the audio interface 1374 may also be coupled to a microphone to receive audible input, such as to facilitate a telephone conversation. In accordance with embodiments of the present disclosure, the microphone may also serve as an audio sensor to facilitate control of notifications, as will be described below. The system 1302 may further include a video interface 1376 that enables an operation of an on-board camera 1230 to record still images, video stream, and the like.

A mobile computing device 1300 implementing the system 1302 may have additional features or functionality. For example, the mobile computing device 1300 may also include additional data storage devices (removable and/or non-removable) such as, magnetic disks, optical disks, or tape. Such additional storage is illustrated in FIG. 13 by the non-volatile storage area 1368.

Data/information generated or captured by the mobile computing device 1300 and stored via the system 1302 may be stored locally on the mobile computing device 1300, as described above, or the data may be stored on any number of storage media that may be accessed by the device via the radio interface layer 1372 or via a wired connection between the mobile computing device 1300 and a separate computing device associated with the mobile computing device 1300, for example, a server computer in a distributed computing network, such as the Internet. As should be appreciated such data/information may be accessed via the mobile computing device 1300 via the radio interface layer 1372 or via a distributed computing network. Similarly, such data/information may be readily transferred between computing devices for storage and use according to well-known data/information transfer and storage means, including electronic mail and collaborative data/information sharing systems.

Figure 14:
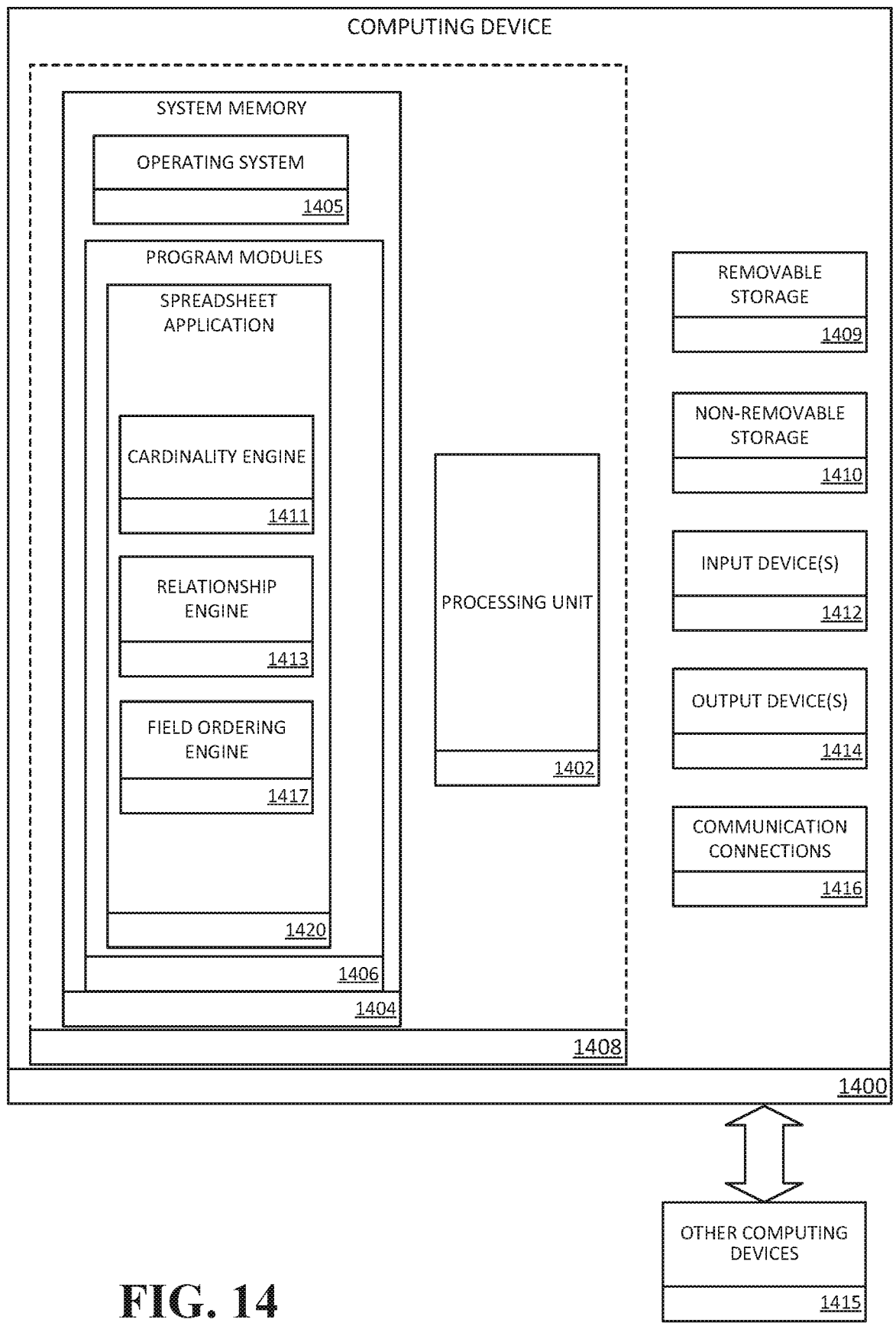
FIG. 14 is a block diagram illustrating example physical components of a computing device with which aspects of the disclosure may be practiced.

FIG. 14 is a block diagram illustrating physical components (e.g., hardware) of a computing device 1400 with which aspects of the disclosure may be practiced. The computing device components described below may have computer executable instructions for automatically generating pivot tables. In a basic configuration, the computing device 1400 may include at least one processing unit 1402 and a system memory 1404. Depending on the configuration and type of computing device, the system memory 1404 may comprise, but is not limited to, volatile storage (e.g., random access memory), non-volatile storage (e.g., read-only memory), flash memory, or any combination of such memories. The system memory 1404 may include an operating system 1405 suitable for running one or more software applications. The operating system 1405, for example, may be suitable for controlling the operation of the computing device 1400. Furthermore, embodiments of the disclosure may be practiced in conjunction with a graphics library, other operating systems, or any other application program and is not limited to any particular application or system. This basic configuration is illustrated in FIG. 14 by those components within a dashed line 1408. The computing device 1400 may have additional features or functionality. For example, the computing device 1400 may also include additional data storage devices (removable and/or non-removable) such as, for example, magnetic disks, optical disks, or tape. Such additional storage is illustrated in FIG. 14 by a removable storage device 1409 and a non-removable storage device 1410.

As stated above, a number of program modules and data files may be stored in the system memory 1404. While executing on the processing unit 1402, the program modules 1406 (e.g., spreadsheet application 1420) may perform processes including, but not limited to, the aspects, as described herein. Spreadsheet application 1420 may include one or more engines or modules for executing operations described herein. As examples, spreadsheet application 1420 may include cardinality engine 1411, relationship engine 1413, and field ordering engine 1417.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 14 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1400 may also have one or more input device(s) 1412 such as a keyboard, a mouse, a pen, a sound or voice input device, a touch or swipe input device, etc. The output device(s) 1414 such as a display, speakers, a printer, etc. may also be included. The aforementioned devices are examples and others may be used. The computing device 1400 may include one or more communication connections 1416 allowing communications with other computing devices 1450. Examples of suitable communication connections 1416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1404, the removable storage device 1409, and the non-removable storage device 1410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1400. Any such computer storage media may be part of the computing device 1400. Computer readable media and computer storage media as described herein does not include transitory media such as a carrier wave or other propagated or modulated data signal. A computer readable storage device as described herein does not include transitory media such as a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 15:
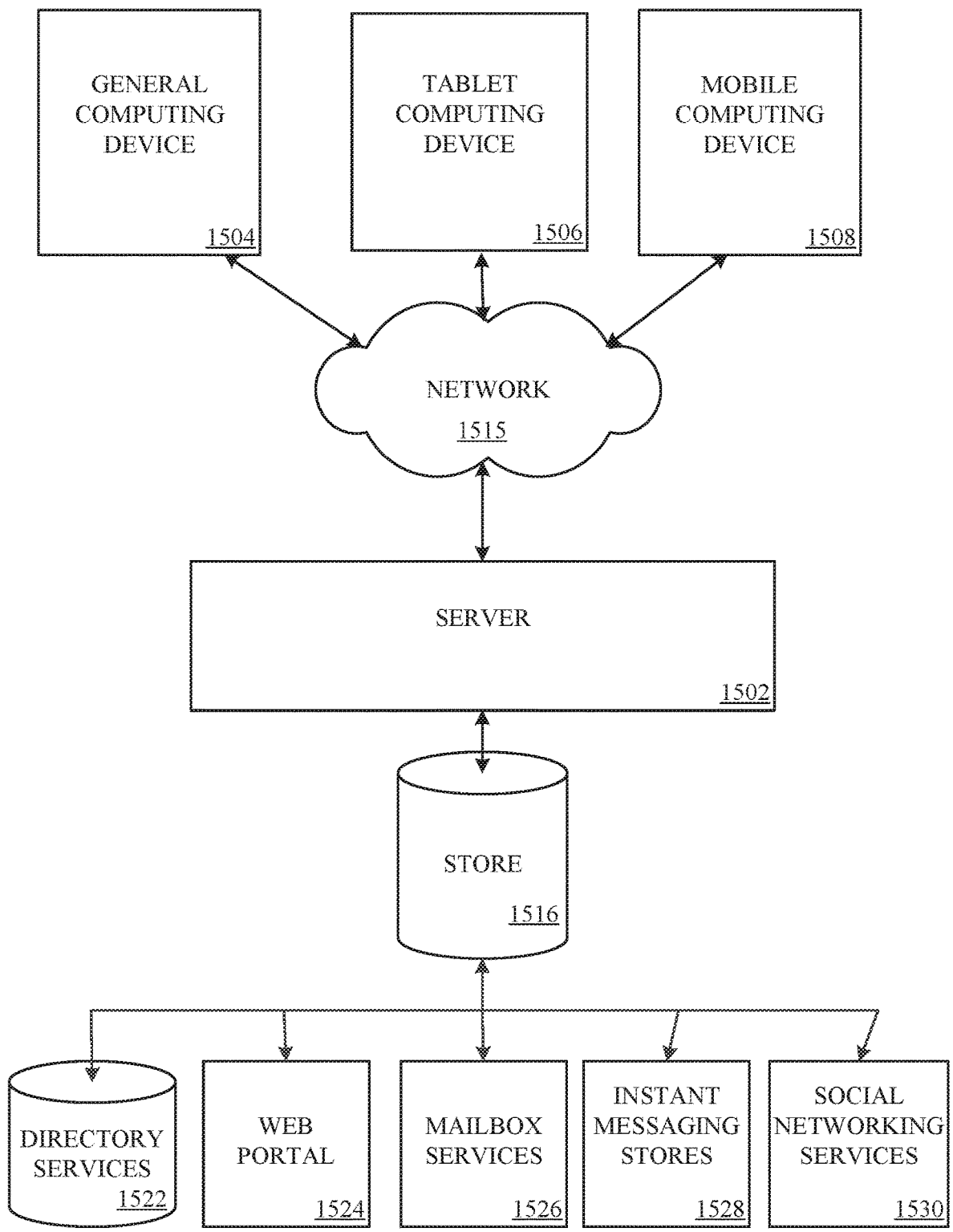
FIG. 15 is a simplified block diagram of a distributed computing system in which aspects of the present disclosure may be practiced.

FIG. 15 illustrates one aspect of the architecture of a system for processing data received at a computing system from a remote source, such as a personal/general computer 1504, tablet computing device 1506, or mobile computing device 1508, as described above. Content displayed at server device 1502 may be stored in different communication channels or other storage types. For example, various documents may be stored using a directory service 1522, a web portal 1524, a mailbox service 1526, an instant messaging store 1528, or a social networking site 1530. The program modules 1506 may be employed by a client that communicates with server device 1502, and/or the program modules 1406 may be employed by server device 1502. The server device 1502 may provide data to and from a client computing device such as a personal/general computer 1504, a tablet computing device 1506 and/or a mobile computing device 1508 (e.g., a smart phone) through a network 1515. By way of example, the computer system described above may be embodied in a personal/general computer 1504, a tablet computing device 1506 and/or a mobile computing device 1508 (e.g., a smart phone). Any of these embodiments of the computing devices may obtain content from the store 1516, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure. The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method comprising:
receiving an indication to generate a pivot table from an existing table in a software application or service;
determining a plurality of fields included in the existing table to populate the pivot table with;
arranging, in memory, the plurality of fields in a first order;
arranging an order of the plurality of fields from the first order to a semantic hierarchical order based on a set of cardinality relationship rules;
identifying a plurality of blocks included in the plurality of fields in the semantic hierarchical order;
generating the pivot table with the plurality of fields, wherein the generating comprises:
populating columns in the pivot table from fields included in one or more blocks of the plurality of blocks that have a cardinality value less than a threshold cardinality value, and
populating rows in the pivot table from fields included in one or more blocks of the plurality of blocks that have a cardinality value that meets or exceeds the threshold cardinality value; and
rendering the pivot table in the software application or service.

2. The computer-implemented method of claim 1, further comprising:
transforming data from the existing table to a structured query language (SQL) format;
determining, from the data in the SQL format, a first set of cardinality values corresponding to a number of instances of unique values for each of the plurality of fields; and
determining, from the data in the SQL format, a second set of cardinality values corresponding to a number of unique values for combinations of the plurality of fields.

3. The computer-implemented method of claim 1, wherein arranging the order of the plurality of fields comprises determining cardinality relationships between fields of the plurality of fields, wherein the cardinality relationships are selected from a group comprising: one-to-one; one-to-many; many-to-one; and many-to-many.

4. The computer-implemented method of claim 1, wherein the semantic hierarchical order comprises:
fields having many-to-one cardinality relationships arranged before any other fields;
fields having one-to-one cardinality relationships arranged directly after fields having many-to-one cardinality relationships;
fields having one-to-many cardinality relationships arranged directly after fields having one-to-one cardinality relationships; and
fields having many-to-many cardinality relationships arranged directly after fields having one-to-many cardinality relationships.

5. The computer-implemented method of claim 1, wherein identifying the plurality of blocks included in the plurality of fields in the semantic hierarchical order comprises:
identifying one or more consecutive fields in the semantic hierarchical order that comprise one-to-one cardinality relationships or one-to-many cardinality relationships; and
identifying one or more consecutive fields in the semantic hierarchical order having many-to-many cardinality relationships.

6. The computer-implemented method of claim 1, further comprising arranging the plurality of blocks in a block order based on a cardinality value of each of the plurality of blocks.

7. The computer-implemented method of claim 6, wherein:
the columns of the pivot table are populated iteratively from left to right based on the block order; and
the rows of the pivot table are populated iteratively from top to bottom based on the block order.

8. The computer-implemented method of claim 1, wherein:
receiving the indication to generate the pivot table comprises receiving a first user input to the software application or service to generate the pivot table; and
determining the plurality of fields included in the existing table to populate the pivot table with comprises receiving a selection of the plurality of fields, via a user input, to a pivot table generation tool of the software application or service.

9. The computer-implemented method of claim 1, wherein:
receiving the indication to generate the pivot table comprises processing a natural language input with a machine learning model that has been trained to identify task intents;
identifying an intent to generate a pivot table; and
determining the plurality of fields included in the existing table to populate the pivot table with comprises processing the natural language input with a language processing model that has been trained to score and rank fields for use in pivot tables.

10. The computer-implemented method of claim 1, wherein the threshold cardinality value is dynamic and changes based on one or more of: a size of a display that the software application or service is displayed on; a size of an application window that the software application or service is rendered in; and a font size of one or more characters included in the existing table.

11. The computer-implemented method of claim 1, wherein determining the plurality of fields included in the existing table to populate the pivot table with comprises:
determining that a specific field in the existing table is associated with measure values; and
automatically filtering, based on the determination that the specific field is associated with measure values, the specific field from inclusion in the plurality of fields to populate the pivot table with.

12. The computer-implemented method of claim 11, wherein the plurality of fields are each associated with dimension values.

13. The computer-implemented method of claim 1, further comprising:
receiving an indication to represent data from the existing table as data over time in the pivot table;
determining that one of the plurality of fields is a temporal field; and
automatically populating a first row of the pivot table with the temporal field.

14. The computer-implemented method of claim 1, wherein determining the plurality of fields included in the existing table to populate the pivot table with comprises:
    determining that the existing table has greater than a threshold number of rows; and
    automatically filtering, based on the determination that the existing table has greater than a threshold number of rows, a plurality of rows from further processing.

15. The computer-implemented method of claim 14, wherein the threshold number of rows is dynamic and associated with processing resources of a computing device generating the pivot table.

16. A system comprising:
    a memory for storing executable program code; and
    a processor, functionally coupled to the memory, the processor being responsive to computer-executable instructions contained in the program code and operative to:
        receive an indication to generate a pivot table from an existing table in a software application or service;
        determine a plurality of fields included in the existing table to populate the pivot table with;
        arrange, in memory, the plurality of fields in a first order;
        arrange an order of the plurality of fields from the first order to a semantic hierarchical order based on a set of cardinality relationship rules;
        identify a plurality of blocks included in the plurality of fields in the semantic hierarchical order;
        generate the pivot table with the plurality of fields, wherein the generating comprises:
            populating columns in the pivot table from fields included in a block of the plurality of blocks that has a cardinality value less than a threshold cardinality value, and
            populating rows in the pivot table from fields included in one or more blocks of the plurality of blocks that have a cardinality value that meets or exceeds the threshold cardinality value; and
        render the pivot table in the software application or service.

17. The system of claim 16, wherein the processor is further responsive to the computer-executable instructions contained in the program code an operative to:
    transform data from the existing table to a structured query language (SQL) format;
    determine, from the data in the SQL format, a first set of cardinality values corresponding to a number of instances of unique values for each of the plurality of fields; and
    determine, from the data in the SQL format, a second set of cardinality values corresponding to a number of unique values for combinations of the plurality of fields.

18. The system of claim 16, wherein the processor is further responsive to the computer-executable instructions contained in the program code and operative to:
    determine a block order of the plurality of blocks based on a cardinality value of the plurality of blocks; and
    wherein:
    the columns of the pivot table are populated iteratively from left to right based on the block order; and
    the rows of the pivot table are populated iteratively from top to bottom based on the block order.

19. A computer-readable storage device comprising executable instructions that, when executed by a processor, assist with generating a pivot table, the computer-readable storage device including instructions executable by the processor for:
    receiving an indication to generate the pivot table from an existing table in a software application or service;
    determining a plurality of fields included in the existing table to populate the pivot table with;
    arranging, in memory, the plurality of fields in a first order;
    arranging an order of the plurality of fields from the first order to a semantic hierarchical order based on a set of cardinality relationship rules;
    identifying a plurality of blocks included in the plurality of fields in the semantic hierarchical order;
    generating the pivot table with the plurality of fields, wherein the generating comprises:
        populating columns in the pivot table from fields included in a block of the plurality of blocks that has a cardinality value less than a threshold cardinality value, and
        populating rows in the pivot table from fields included in one or more blocks of the plurality of blocks that have a cardinality value that meets or exceeds the threshold cardinality value; and
    rendering the pivot table in the software application or service.

20. The computer-readable storage device of claim 19, wherein the instructions are further executable by the processor for:
    determining a first set of cardinality values corresponding to a number of instances of unique values for each of the plurality of fields; and
    determining a second set of cardinality values corresponding to a number of unique values for combinations of the plurality of fields.

* * * * *